(12) United States Patent
Temple et al.

(10) Patent No.: US 12,322,009 B2
(45) Date of Patent: Jun. 3, 2025

(54) EXTRACTED IMAGE SEGMENTS COLLAGE

(71) Applicant: Pinterest, Inc., San Francisco, CA (US)

(72) Inventors: David Temple, Mill Valley, CA (US); Ryan Wilson Probasco, San Leandro, CA (US); Albert Pereta Farre, San Francisco, CA (US); Steven Ramkumar, San Francisco, CA (US); Rohan Mahadev, New York, NY (US); Luke Zhao, Irvine, CA (US); Dmitry Olegovich Kislyuk, San Ramon, CA (US); David Ding-Jia Xue, San Francisco, CA (US)

(73) Assignee: Pinterest, Inc., San Francisco, CA (US)

( * ) Notice: Subject to any disclaimer, the term of this patent is extended or adjusted under 35 U.S.C. 154(b) by 192 days.

(21) Appl. No.: 17/666,997

(22) Filed: Feb. 8, 2022

(65) Prior Publication Data
US 2023/0196645 A1 Jun. 22, 2023

Related U.S. Application Data

(60) Provisional application No. 63/291,276, filed on Dec. 17, 2021.

(51) Int. Cl.
*G06F 17/00* (2019.01)
*G06Q 30/0601* (2023.01)
*G06T 7/11* (2017.01)
*G06T 11/60* (2006.01)
*G06V 10/25* (2022.01)
(Continued)

(52) U.S. Cl.
CPC .......... *G06T 11/60* (2013.01); *G06Q 30/0623* (2013.01); *G06T 7/11* (2017.01); *G06V 10/25* (2022.01); *G06V 10/26* (2022.01); *G06V 10/7747* (2022.01); *G06V 10/82* (2022.01); *G06T 2207/20021* (2013.01); *G06T 2207/20081* (2013.01); *G06T 2207/20084* (2013.01)

(58) Field of Classification Search
CPC .......... G06T 11/60; G06T 7/11; G06V 10/25; G06V 10/7747; G06V 10/26; G06V 10/82; G06Q 30/0623
See application file for complete search history.

(56) References Cited

U.S. PATENT DOCUMENTS 10,878,535 B2 12/2020 Yadav et al.
11,262,986 B2 * 3/2022 Narangodage ....... G06Q 10/047
(Continued)

OTHER PUBLICATIONS

Fuwen Tan et al, Where and Who? Automatic Semantic-Aware Person Composition, IEEE, 10 pages (Year: 2018).*
(Continued)

*Primary Examiner* — Mohammed H Zuberi
(74) *Attorney, Agent, or Firm* — Haynes and Boone, LLP

(57) ABSTRACT

Described are systems and methods to extract image segments from an image and include those extracted image segments in a collage. The origin information, such as the source image, source image location, etc., from which the extracted image segment is generated is maintained as metadata so that interaction with the extracted image segment on the collage can be used to determine and/or return to the origin of the extracted image segment. Collages may be updated, shared, adjusted, etc., by the creator of the collage or other users.

22 Claims, 26 Drawing Sheets

(51) Int. Cl.
*G06V 10/26* (2022.01)
*G06V 10/774* (2022.01)
*G06V 10/82* (2022.01)

(56) References Cited

U.S. PATENT DOCUMENTS

| | | | |
|---|---|---|---|
| 2004/0111332 A1* | 6/2004 | Baar | G06T 11/60 |
| | | | 705/50 |
| 2004/0122690 A1* | 6/2004 | Willoughby | G06Q 10/083 |
| | | | 705/337 |
| 2006/0104542 A1 | 5/2006 | Blake et al. | |
| 2007/0058884 A1 | 3/2007 | Rother et al. | |
| 2007/0188626 A1* | 8/2007 | Squilla | G06T 5/001 |
| | | | 348/222.1 |
| 2008/0069409 A1* | 3/2008 | Kojima | G06F 16/4393 |
| | | | 707/E17.031 |
| 2008/0271008 A1* | 10/2008 | Dettori | G06F 8/24 |
| | | | 717/168 |
| 2010/0058262 A1* | 3/2010 | Morizawa | G06F 30/20 |
| | | | 716/106 |
| 2010/0226566 A1* | 9/2010 | Luo | G06T 7/11 |
| | | | 382/164 |
| 2010/0262471 A1* | 10/2010 | Hughes | G06Q 10/101 |
| | | | 705/7.29 |
| 2013/0030859 A1* | 1/2013 | Jung | G06Q 10/06 |
| | | | 705/7.26 |
| 2014/0150115 A1* | 5/2014 | Ciudad | G06F 21/10 |
| | | | 726/28 |
| 2014/0207611 A1* | 7/2014 | Cleary | G06Q 30/0633 |
| | | | 705/26.8 |
| 2015/0178786 A1* | 6/2015 | Claessens | G06Q 30/0277 |
| | | | 705/14.66 |
| 2015/0332117 A1* | 11/2015 | Zhou | G06V 10/42 |
| | | | 382/201 |
| 2017/0351401 A1* | 12/2017 | Pascale | G06N 20/00 |
| 2018/0152506 A1* | 5/2018 | Simó | G06Q 10/06 |
| 2018/0174340 A1 | 6/2018 | Shah et al. | |
| 2019/0107410 A1* | 4/2019 | Chakraborty | G06F 16/29 |
| 2019/0164322 A1 | 5/2019 | Kong et al. | |
| 2019/0236786 A1* | 8/2019 | McNerney | G06T 7/11 |
| 2022/0091706 A1* | 3/2022 | Winn | G06F 16/54 |
| 2023/0259549 A1* | 8/2023 | Kim | G06N 20/00 |
| | | | 707/758 |

OTHER PUBLICATIONS

Fang et al, Narrative Collage of Image Collections by Scene Graph Recombination, Sep. 2018, IEEE Transactions on Visualizations and Computer Graphics vol. 24, No. 9, pp. 2559-2572 (Year: 2018).*

International Search Report and Written Opinion dated Apr. 11, 2023, in corresponding International Application No. PCT/US2022/081875.

* cited by examiner

EXTRACTED IMAGE SEGMENTS COLLAGE

PRIORITY CLAIM

This application claims priority to U.S. Provisional Patent Application No. 63/291,276, filed Dec. 17, 2021, and titled "Extracted Image Segments Collage," the contents of which are herein incorporated by reference in their entirety.

BACKGROUND

With the ever expanding amount of accessible digital content available to users and customers, it continues to become more and more difficult for users to organize and maintain information relating to digital content of interest and/or discovered by the user. For example, some systems allow users to maintain links or bookmarks to websites or specific webpages discovered by a user. Other systems also allow users to store images of items discovered by users.

DETAILED DESCRIPTION

Figure 1A:
FIGS. 1A through 1O are representations of a graphical user interface, the creation of a collage of extracted image segments, and a remix of the created collage, in accordance with disclosed implementations.

Described are systems and methods to extract image segments, referred to herein as extracted image segments, from an image and include those image segments in a collage. The origin information, such as the source image, source image location, etc., from which the extracted image segment is generated, is maintained as metadata so that interaction with the extracted image segment on the collage can be used to determine and/or return to the origin of the extracted image segment. For example, if an extracted image segment on a collage originated from an e-commerce website, the address to the e-commerce website may be maintained in metadata of the extracted image segment when generated and added to the collage.

Extracted image segments may be positioned anywhere on a collage that is presented on a user device. For example, extracted image segments may be visually stacked with respect to other extracted image segments of the collage, extracted image segments may be rotated, extracted image segments may be adjusted in size, etc. Likewise, in some implementations, extracted image segments may be animated or otherwise distinguished when presented as part of a collage when presented.

In some implementations, an object represented in an extracted image segment may be buyable. For example, a seller of an item represented in an extracted image segment of a collage may be determined and associated with and/or identified in the metadata of the extracted image segment. Likewise, an indicator may be presented with the extracted image segment to indicate that the object represented in the extracted image segment may be purchased from the seller. A user, when viewing the collage, may interact with the extracted image segment and, for example, be redirected to the e-commerce website of the seller of the object and complete a purchase of the object. In other implementations, the user may interact with the extracted image segment and directly purchase the object represented in the extracted image segment.

As discussed further below, an image segment and/or extracted image segment may be any portion of an image and may correspond to an object represented in the image segment/extracted image segment. In some implementations, an image may be processed by a deep neural network ("DNN") that is trained to detect object(s) in an image and segment the image such that each object represented in the image corresponds to an image segment of the image. When viewing the image, the image segments determined for an image may be presented such that they are visually distinguished from the image. A user may select an image segment and the pixels of the image corresponding to the selected image segment are extracted to generate an extracted image segment. Likewise, metadata, such as an indication of the image, the location of the image, a link to a website from which the object represented by the extracted image segment can be purchased or obtained, additional information about the object, reviews of the object, a link to a second collage from which the image or the extracted image segment were obtained, a popularity of the extracted image segment, an indication of a user that created the extracted image segment, etc., may be included in the extracted image segment.

FIGS. 1A through 1O are representations of a graphical user interface, the creation of a collage of extracted image segments, and a remix of the created collage, in accordance with disclosed implementations. As illustrated, the disclosed implementations may be performed in whole or in part on a user device 100 such as a cell phone, smart phone, tablet, wearable, laptop, desktop, etc. In other implementations, portions of the disclosed implementations, such as image processing, image segmentation, and/or extraction of image segments, may be performed on one or more remote computing resources and images, image segments, extracted image segments, collage generation, etc., performed on the user device. As will be appreciated, any variation of processing and/or other operations of the disclosed implementations may be performed on one or many different devices. Likewise, the disclosed implementations, may, for example, be provided as part of a social networking environment, e-commerce environment, or any other form of interactive computing.

Turning first to FIG. 1A, a user interface 111 is presented on a display of a user device 100. In the illustrated example, the user interface 111 includes a plurality of images that may be viewed and optionally selected by a user through interaction with the user device 100. In the example illustrated with respect to FIG. 1A, the user interface includes three columns of images. A user may view any number of images through the user interface 111 and select one or more images.

Images may be provided from a remote data store that is accessible to the user device 100, such as a social networking service, the Internet, etc., may be provided from a memory on the user device, may be generated from a camera or other imaging element of the user device, etc. In general, an image may be obtained from any source and utilized with the disclosed implementations.

Figure 1B:
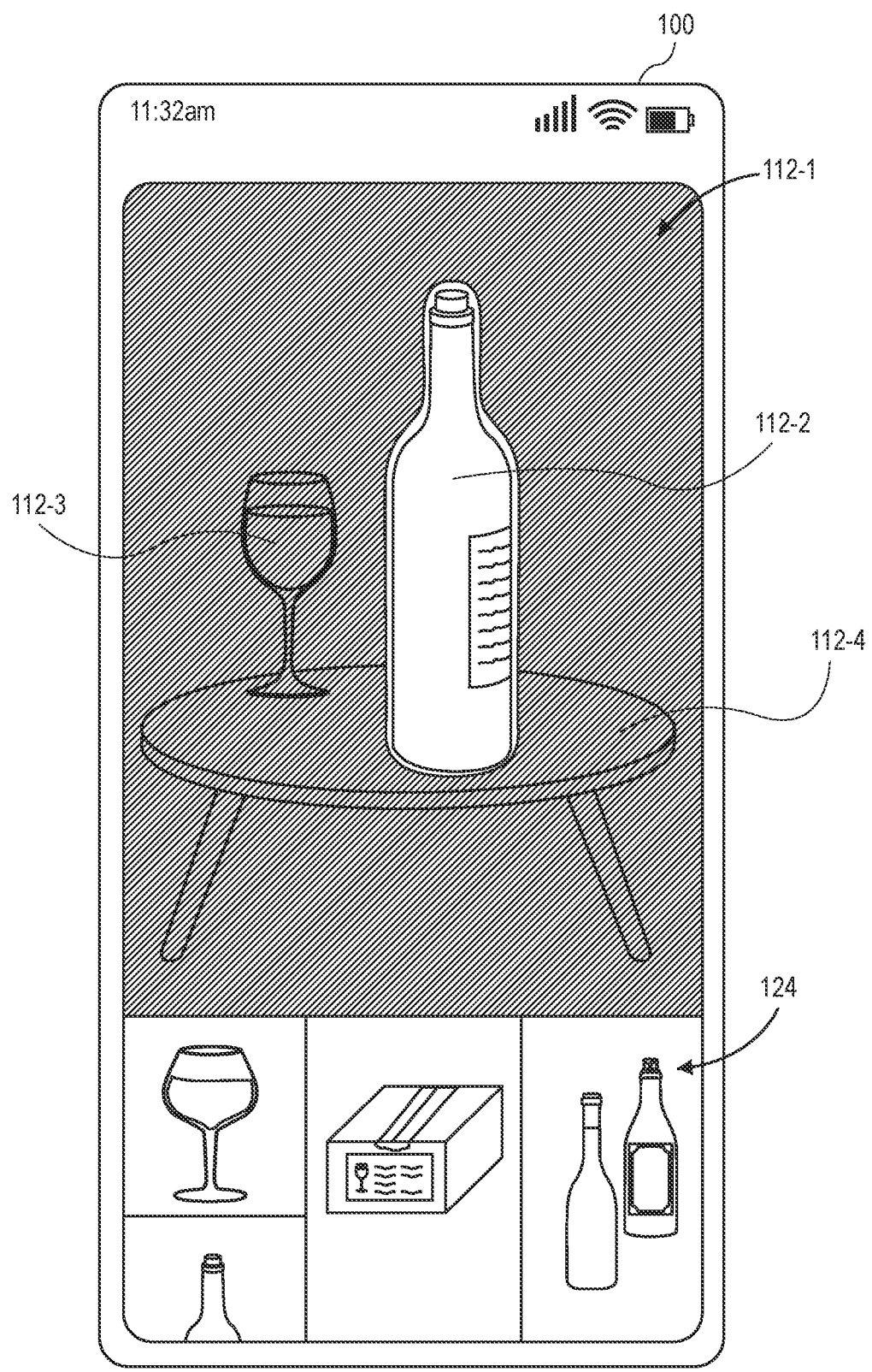

In the illustrated example, the user selects image 112, for example through physical interaction with a touch-based display of the user device. In response to selection of the image 112, and turning to FIG. 1B, an image segment of the image 112 may be determined and presented with the image such that the image segment 112-2 is distinguished from the remainder of the image 112-1. In the illustrated example, the image segment 112-2 of the image 112 (FIG. 1A) includes a wine bottle and when presented by the user device, the image segment 112-2 is presented such that it is visually distinguished from the remainder of the image 112-1. While the example discussed with respect to FIGS. 1A and 1B indicates the wine bottle as the image segment 112-2, in other implementations, other image segments, or all image segments, such as an image segment of the wine glass 112-3 and an image segment for the table 112-4, may be determined and visually presented such that the image segments are visually distinguished.

In some implementations, additional images 124, image segments, and/or extracted image segments, such as images/extracted image segments that are visually similar to the image segment 112-2 may also be presented on the user interface of the device 100 in response to a user selection of an image 112. For example, in some implementations, the popularity or frequency of extracted image segments used on other collages by the same or other users may be monitored and popular or trending extracted image segments presented to the user as additional images 124.

Alternatively, or in addition thereto, and as another example, existing extracted images that are similar to other extracted images included on a collage by the user and/or that are determined to be of potential interest to the user may be presented to the user as additional images 124. Other additional images 124 that may be presented include, but are not limited to extracted image segments that enable purchase of an object represented in the extracted image segments, extracted image segments that are related to an extracted image segment of the collage and/or the image segment, extracted image segments generated by the user that selected the image segment, etc.

In this example, the user interacting with the device selects the image segment 112-2. Upon selection of the image segment 112-2, pixels of the image 112 corresponding to the selected image segment 112-2 are extracted from the image 112 and an extracted image segment that includes the pixels is generated. In addition, as discussed further below, metadata, including but not limited to an indication of the image, the location of the image, a link to a website from which the object represented by the extracted image segment can be purchased or obtained, additional information about the object, reviews of the object, a link to a second collage from which the image or the extracted image segment were obtained, a popularity of the extracted image segment, an indication of a user that created the extracted image segment, etc., may be included in the extracted image segment.

Figure 1C:
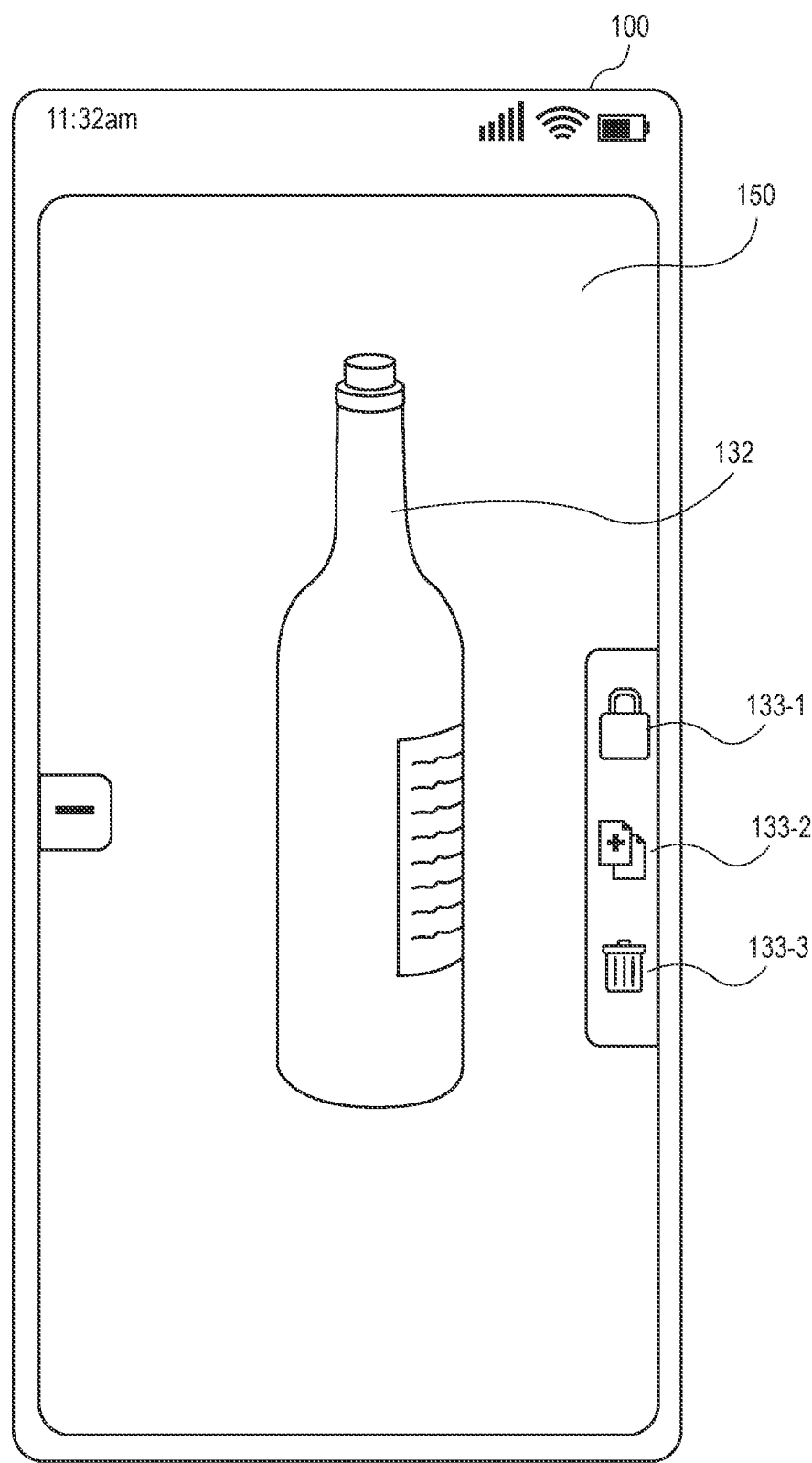

Referring now to FIG. 1C, upon selection of an image segment and generation of the extracted image segment, the extracted image segment 132 is presented on the display of the device 100 as part of a collage 150. A user may interact with the extracted image segment 132 included on the collage 150. For example, the user may crop the extracted image segment, rotate the extracted image segment, increase/decrease the size of the extracted image segment, etc. In some implementations, the object represented in the extracted image segment 132, may be further processed to determine a three-dimensional ("3D") mesh of the object such that a user can rotate the extracted image segment in three-dimensions.

In addition to interacting with the extracted image segment 132, in some implementations, the user may select to lock the extracted image segment so that it cannot be further interacted with, cannot be transformed, the position/size of the extracted image segment cannot be changed, etc., through selection of the lock control 133-1. Alternatively, or in addition thereto, the user may select to generate a duplicate of the extracted image segment 132 through selection of the duplication control 133-2. Finally, if the user decides they do not want to include the extracted image segment 132 in the collage, the user may remove or delete the extracted image segment through selection of the delete control 133-3.

Figure 1D:
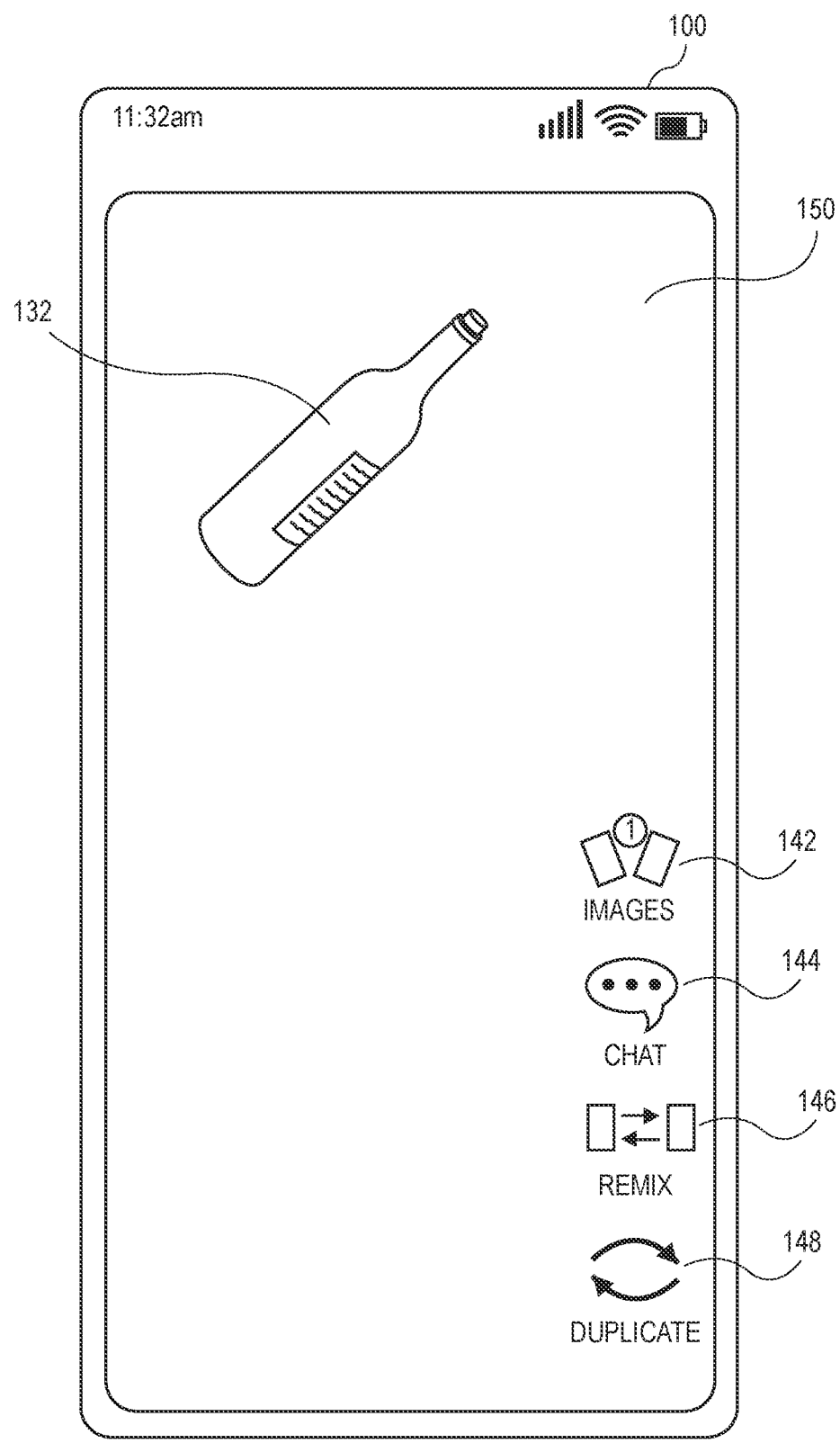

In the illustrated example and referring to FIG. 1D, the user has adjusted the first extracted image segment 132 by decreasing the size of the extracted image segment 132, rotating the extracted image segment 132 and moving the extracted image segment 132 up and to the left portion of the collage 150.

In addition to viewing extracted image segments presented on a collage, additional information indicators 142, 144, 146, 148 may also be presented. The additional information indicator 142 may provide information indicating the number of extracted image segments included on the collage, in this example, one. The additional information indicator 144 may provide the opportunity for the user that created the collage to invite a second user to view the collage, for example making the collage a collaborative collage (as discussed below) and to chat with the second user. The additional information indicator 146 may be a re-mix indicator that, when selected by the user, or another user, remixes the presentation of the extracted image segments of the collage. Remixing may include adjusting the position, size, orientation, stack position, etc. of one or more extracted image segment of a collage. The additional information indicator 148 may be a duplication indicator that, when selected by the user, or another user, causes a duplicate (also referred to as a child copy) of the collage to be generated. Similar to generating a duplicate of a collage in response to a transformation request by another user, as discussed below, a duplicate collage generated in response to selection of the indicator 148 may visually appear the same but the metadata for the collage and image segments may be updated to link back to or otherwise reference the collage from which it was generated.

Figure 1E:
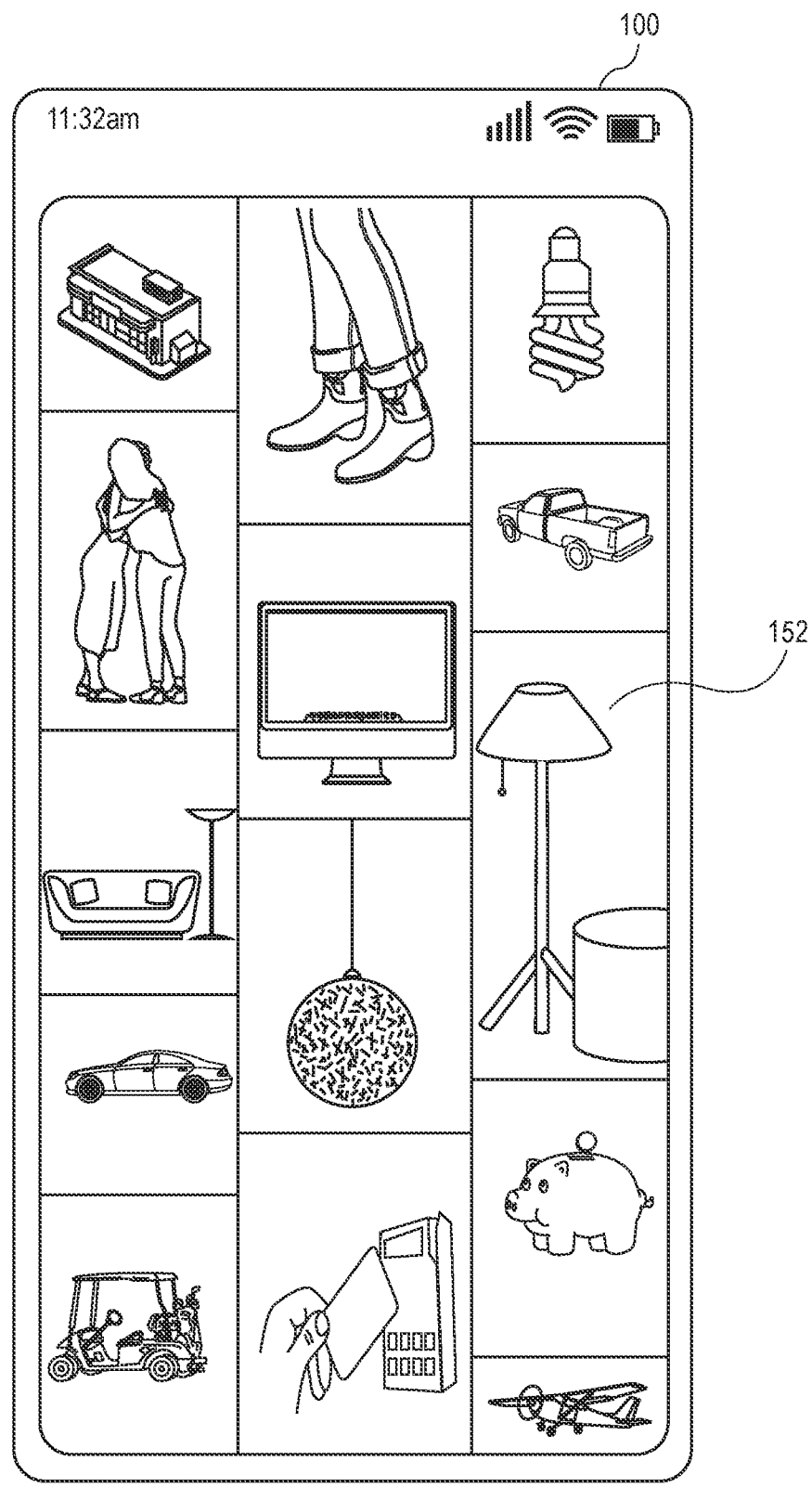
Figure 1F:
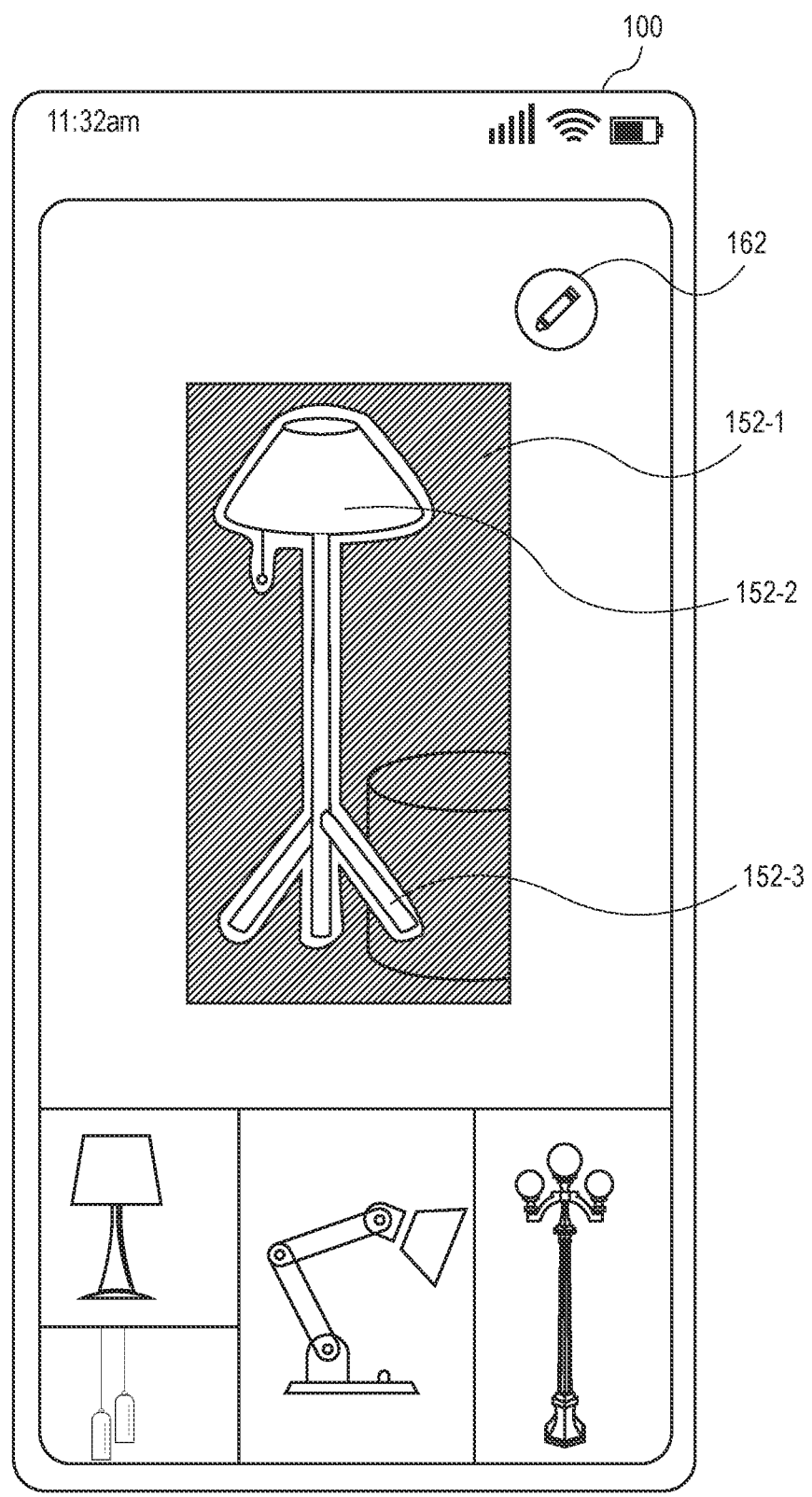

Continuing with the current example and referring now to FIG. 1E, after adding a first extracted image segment 132 to the collage, the user may again view any number of images on a user interface of the device 100. As before, the user may scroll through any number and/or source of images and select an image, such as image 152. In this example, upon selection of the image 152 and referring now to FIG. 1F, an image segment 152-2 corresponding to an object represented in the image, in this example a floor-standing lamp, may be determined and presented to the user via the display of the device 100 such that the image segment 152-2 is visually distinguished from the image 152-1. In the illustrated example, as part of processing of the image to determine objects and generate image segments, processing may likewise be performed to determine if a portion of the object of an image segment is occluded by another object in the image 152. In this example, one of the legs 152-3 of the lamp represented in the image segment 152-2 is determined to be occluded. In such an example, one or more image processing algorithms, such as an inpainting algorithm, may be used to determine the look, shape, and position of the occluded part of the object and present the occluded part of the object as part of the image segment 152-2. Likewise, in some implementations, the user interface may also include a modification control 162 that may be selected by the user to modify the image segment by adjusting the pixels of the image that are included in the image segment. Likewise, for occluded portions of an object corresponding to the image segment, the modification control 162 may be utilized by the user to in-paint or correct a portion of the image segment determined through processing of the image segment.

Figure 1G:
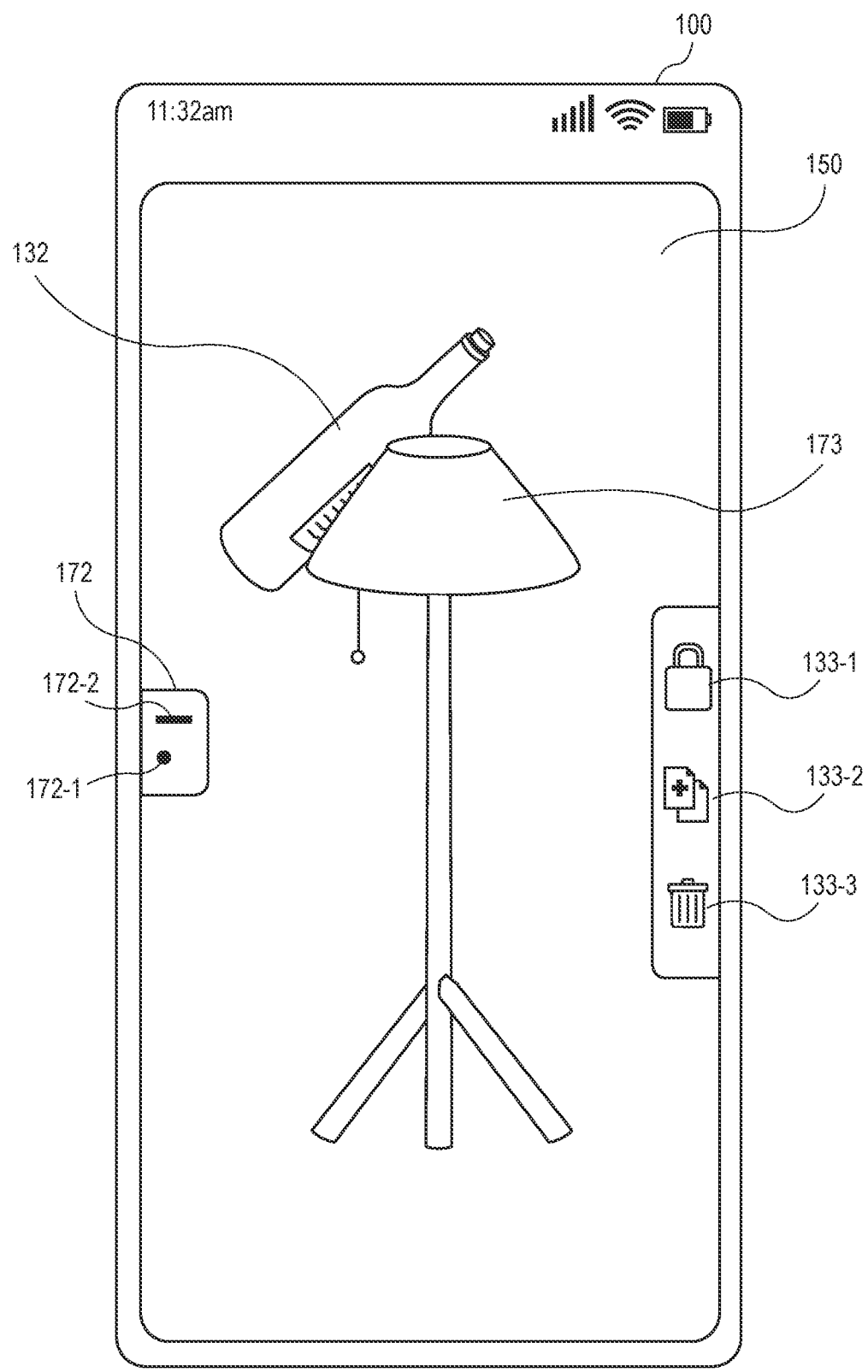
Figure 1H:
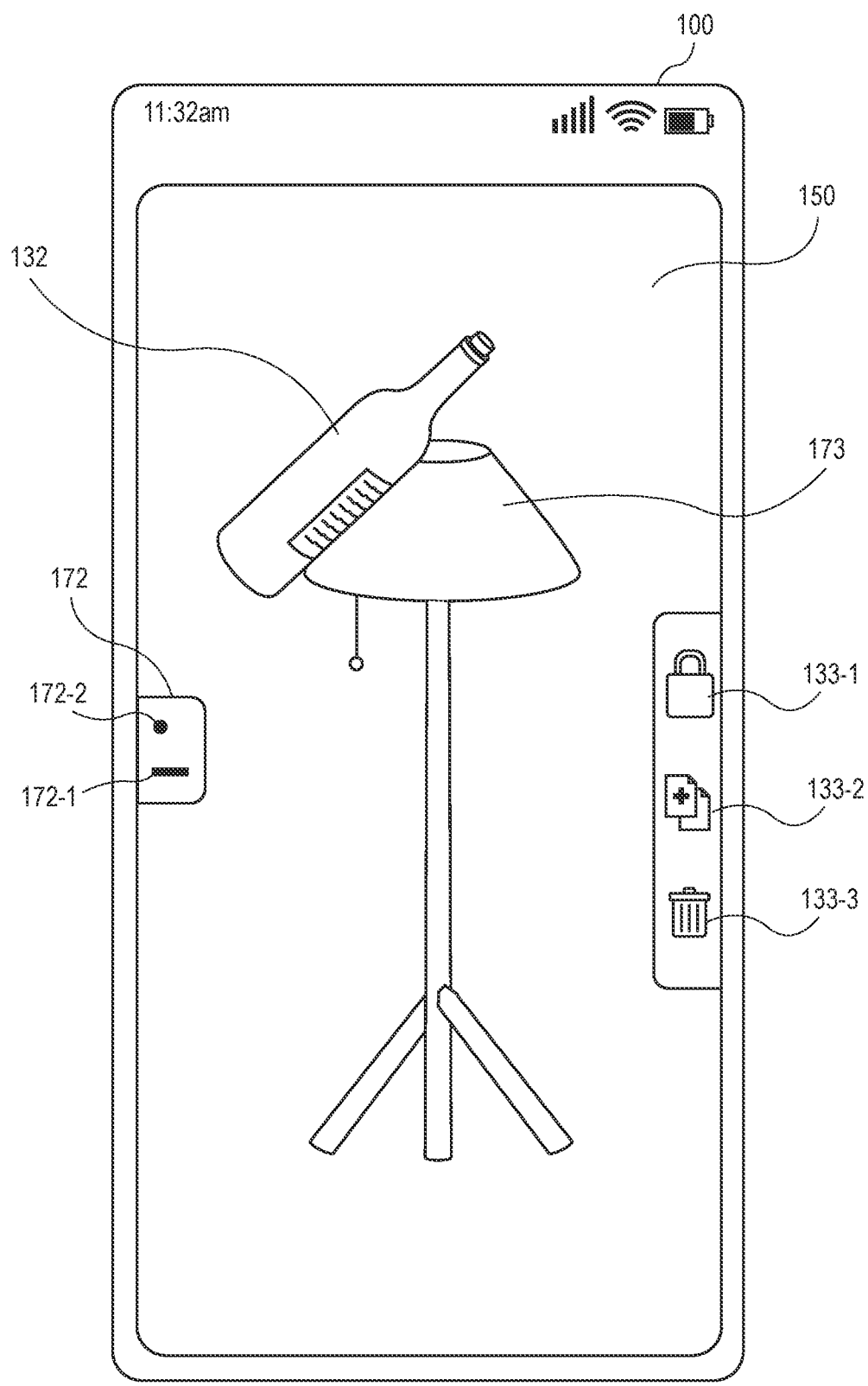

Referring now to FIG. 1G, upon selection of an image segment and generation of the extracted image segment, the extracted image segment 173 is presented on the display of the device 100 as part of a collage 150 along with the other extracted image segments of the collage, in this example, extracted image segment 132. A user may interact with the extracted image segment included on the collage 150. For example, the user may crop the extracted image segment 173, rotate the extracted image segment, increase/decrease the size of the extracted image segment, etc. In some implementations, the object represented in the extracted image segment may be further processed to determine a 3D mesh of the object such that a user can rotate the extracted image segment in three-dimensions. Likewise, when the collage 150 has more than one extracted image segment, a stack control 172 may be included that allows the user to move extracted image segments up or down in the stack with respect to other image segments of the collage. For example, in the collage 150 presented in FIG. 1G, the second extracted image segment 173 is visually presented on the top of a stack such that it is presented on top of the first extracted image segment 132. The user may adjust the position of the extracted image segments through selection of an extracted image segment and interaction with the stack control 172, such as selection of the move up stack control 172-2 or the move down stack control 172-1. For example, comparing FIG. 1G to 1H, in FIG. 1G, the second extracted image segment 173 is presented at the top of the stack and in front of the first extracted image segment 132. In response to the user selecting the second extracted image segment 173 and the move down control 172-1, referring now to FIG. 1H, the second extracted image segment is moved down in the stack and presented behind the first extracted image segment 132.

Figure 1I:
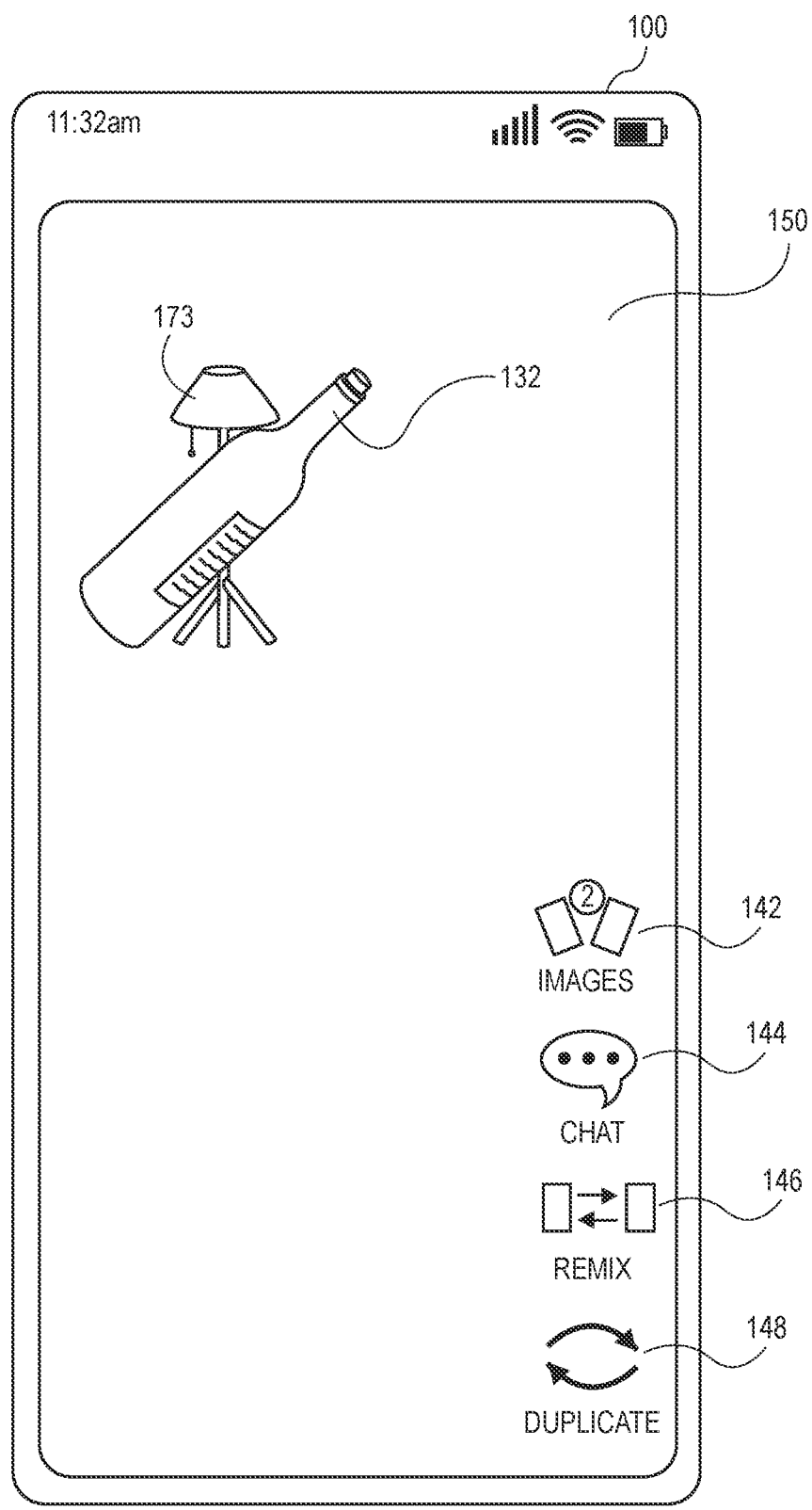

In the illustrated example and referring to FIG. 1I, the user has adjusted the second extracted image segment 173 by decreasing the size of the extracted image segment 173, moving it to the bottom of the stack such that it is presented behind or beneath the first extracted image segment 132, and moved to be centered behind the first extracted image segment 132 in the upper left corner of the collage 150.

Figure 1J:
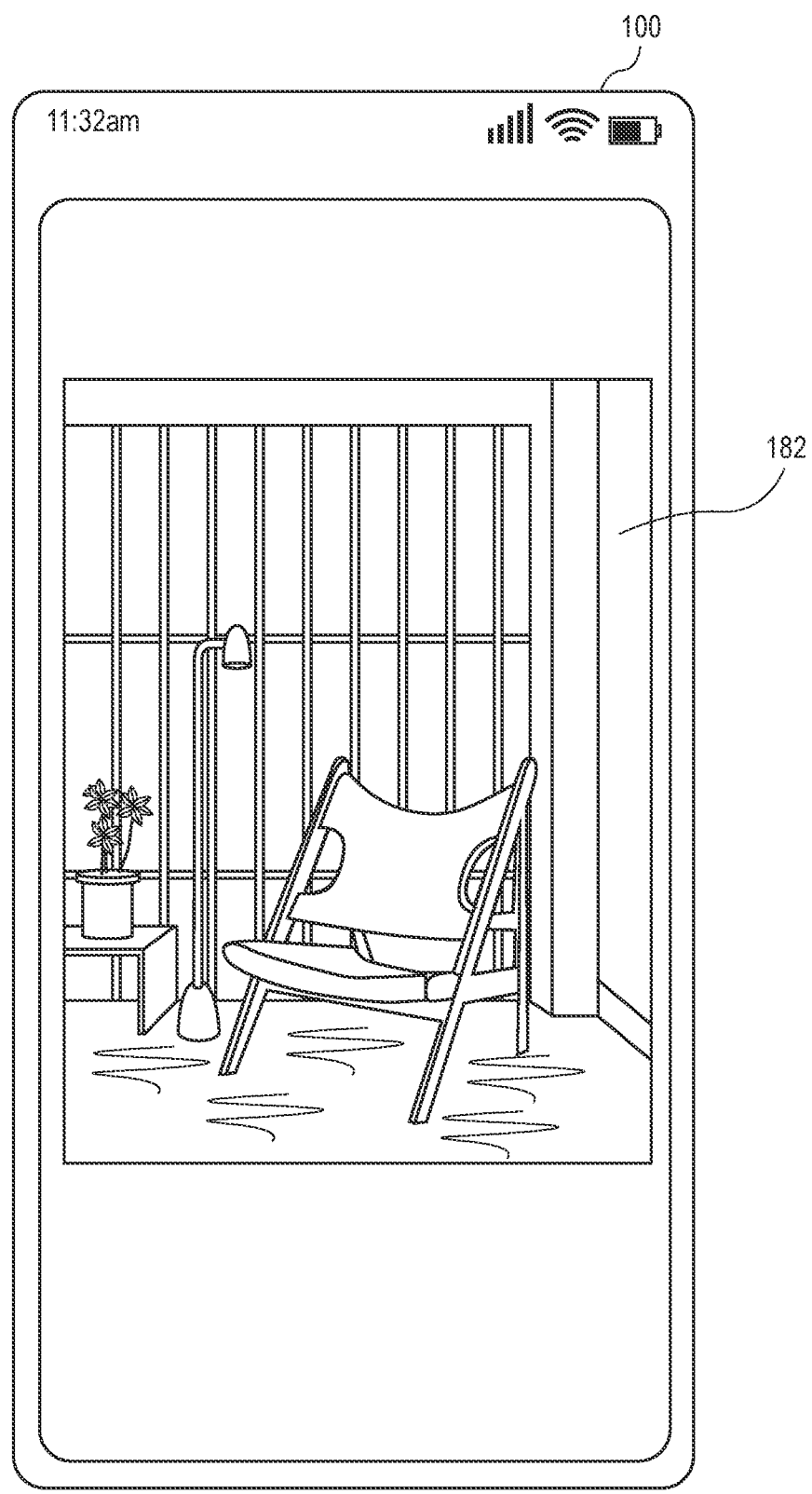
Figure 1K:
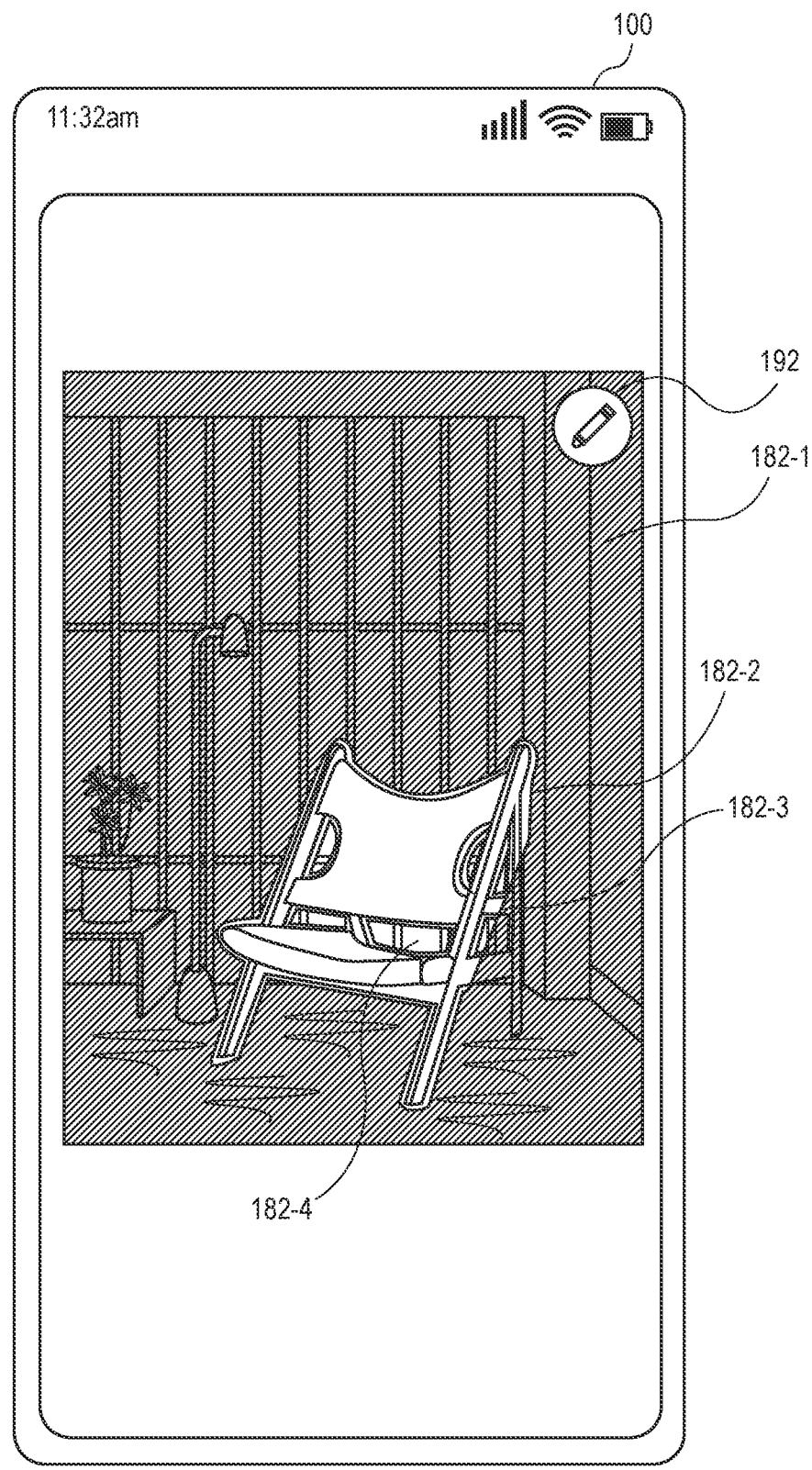

Continuing with the above example and referring now to FIG. 1J, the user has generated an image 182 using an imaging element of the device 100. In this example, the image 182 includes a representation of a chair and other objects. Upon processing the image, as discussed below, an image segment 182-2 corresponding to the chair is determined and presented such that the image segment is visually distinguished from the remainder of the image 182-1, as illustrated in FIG. 1K.

Similar to the above, the user interface may include an alteration control 192 that may be selected by the user to alter pixels of the image 182 that are to be included or excluded from the image segment when extracted. For example, in the example illustrated with respect to FIG. 1K, processing of the image 182 to determine the image segment 182-2 incorrectly excluded pixels representative of the rear leg 182-3 of the chair from the image segment 182-2. Through interaction with the alteration control 192, the user may choose to add or remove pixels from the image segment. For example, and referring to FIG. 1L, the user may interact with the alteration control 192 and select to either add pixels to the image segment, by selecting the add alteration control 192-1 or select to remove pixels from the image segment, by selecting the remove alteration control 192-2. In this example, the user has selected the add alternation control 192-1 and though interaction with the image, such as through a touch-based display of the device 100, indicated which portion of the image and thus the pixels to include or add into the image segment 182-2. Specifically, in this example, the user has selected to include pixels corresponding to the leg 182-3 of the chair. Likewise, the user has also selected the remove alteration control 192-2 and selected to remove the pixels corresponding to the space 182-4 between the seat of the chair and the back of the chair that were originally included in the image segment as a result of a processing of the image segment. Upon altering the image segment to include or exclude pixels, in some implementations, image processing of the image, a portion of the image, such as the altered portion and/or the portion corresponding to the object of interest, may be re-run, as discussed further below.

In some implementations, rather than adjusting an image to include/exclude pixels of an object of interest that is then extracted as an extracted image segment, as discussed herein, a user may select to remove an object from all or a portion of the image. In such an example, the indicated object may be removed from the image or portion of the image and an in-fill or in-painting process, as is known in the art, utilized to assign pixel values to the pixels that previously represented the removed object. As a result, the image may be adjusted to appear as if the object was not included in the image. For example, and referring to FIG. 1K, if the user selected to remove the chair (object) from the image, an in-fill or in-painting process may be utilized to assign pixel values such that the floor and wall of the room represented in the object are represented by the pixels that previously represented the chair.

Figure 1L:
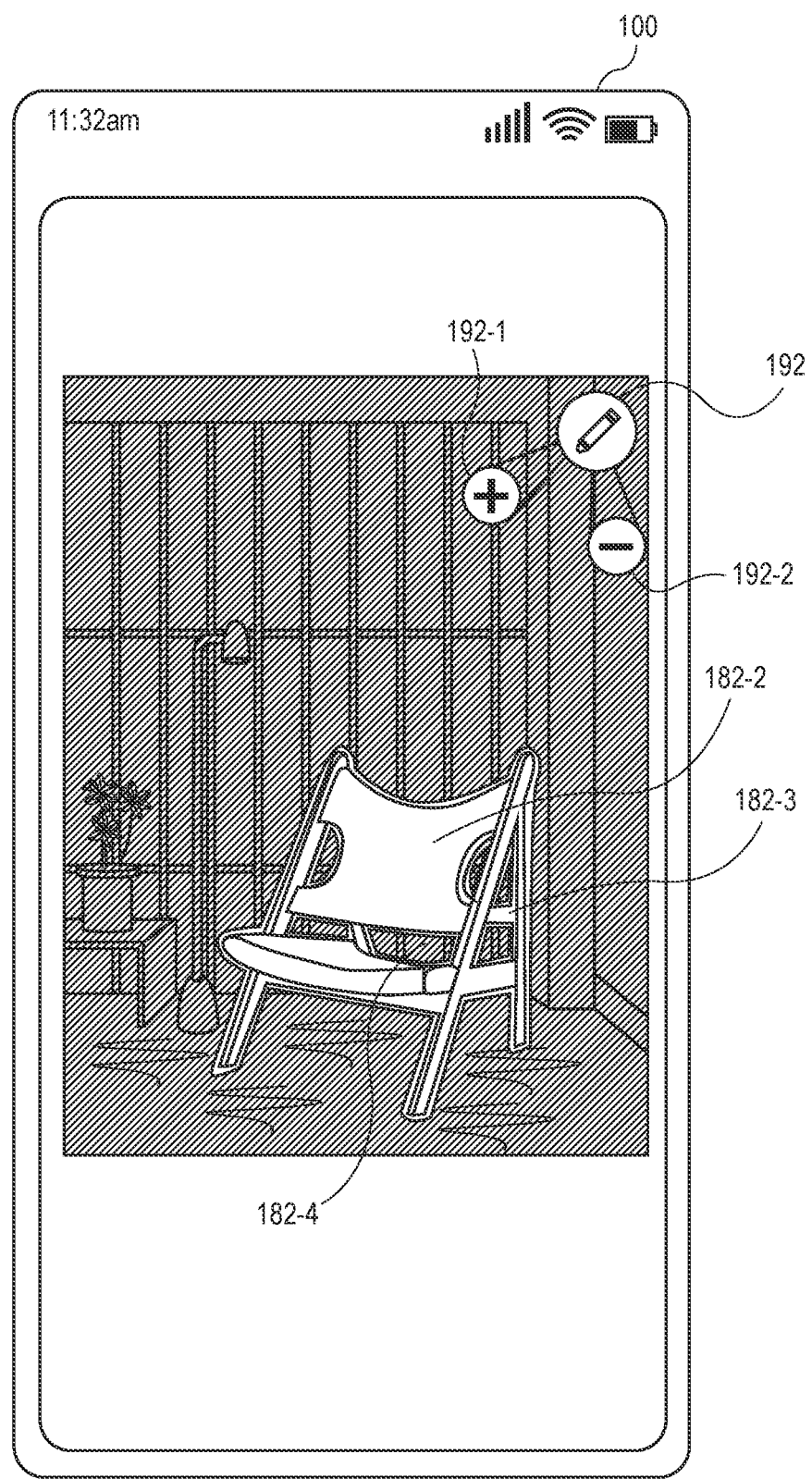
Figure 1M:
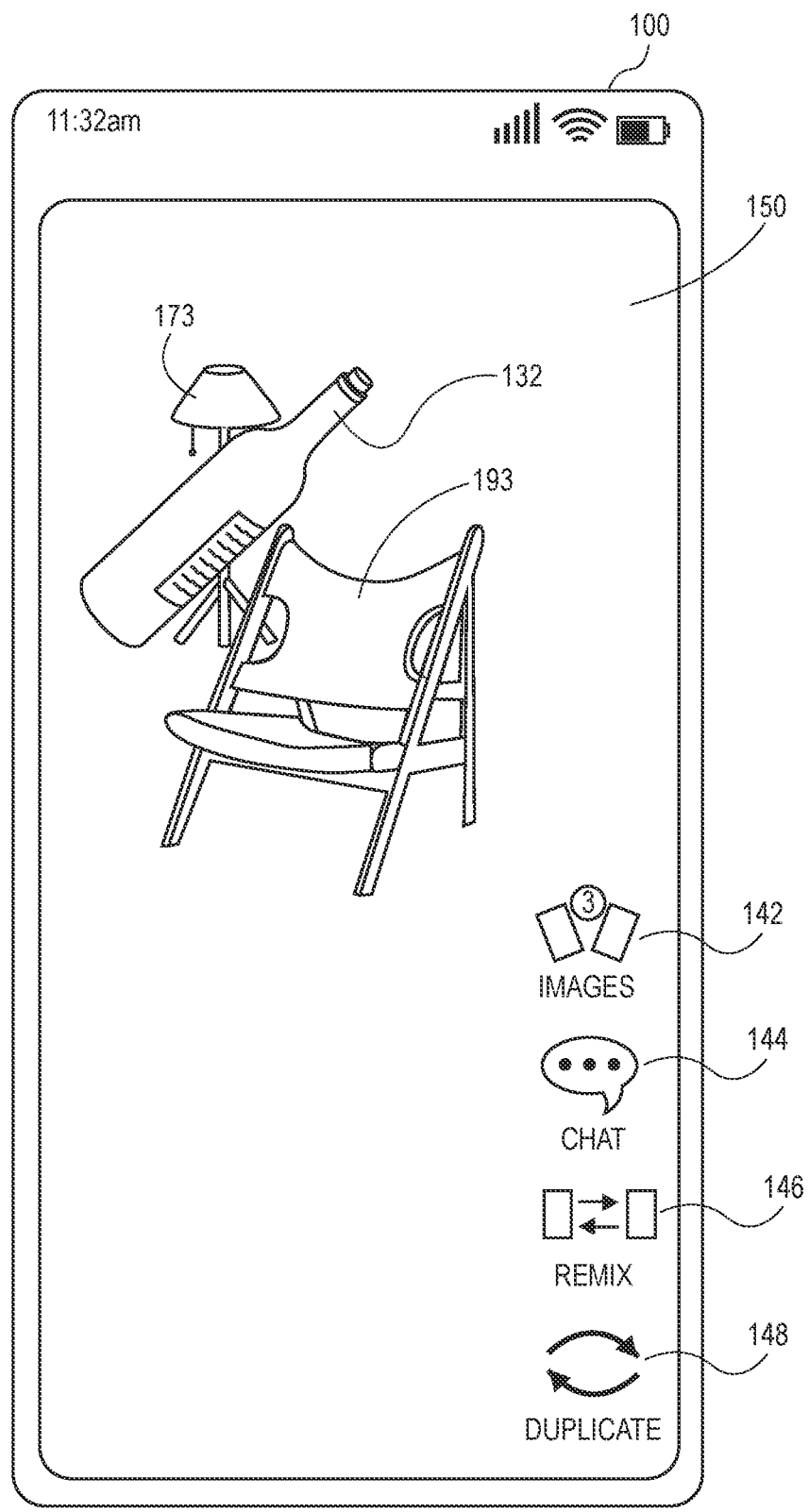

After altering the image segment, the user may select the image segment and an extracted image segment 193 may be generated that includes the pixels of the image corresponding to the image segment 182-2 and metadata for the image segment. Likewise, the extracted image segment 193 is presented on the collage 150 with the other extracted image segments 132, 173, and the user may adjust the extracted image segment, as discussed. Referring now to FIG. 1M, in this example, the user has adjusted the third extracted image segment 193 to be positioned near the first extracted image segment 132 and the second extracted image segment 173, as well as in-front of the second extracted image segment 173. In addition, the image's additional information 142 now includes metadata for each of the three extracted image segments 132, 173, 193 that may be selected and viewed by the user, or other viewers of the collage. Likewise, the image's additional information 142 now indicates that there are three extracted images included in the collage 150.

Figure 1N:
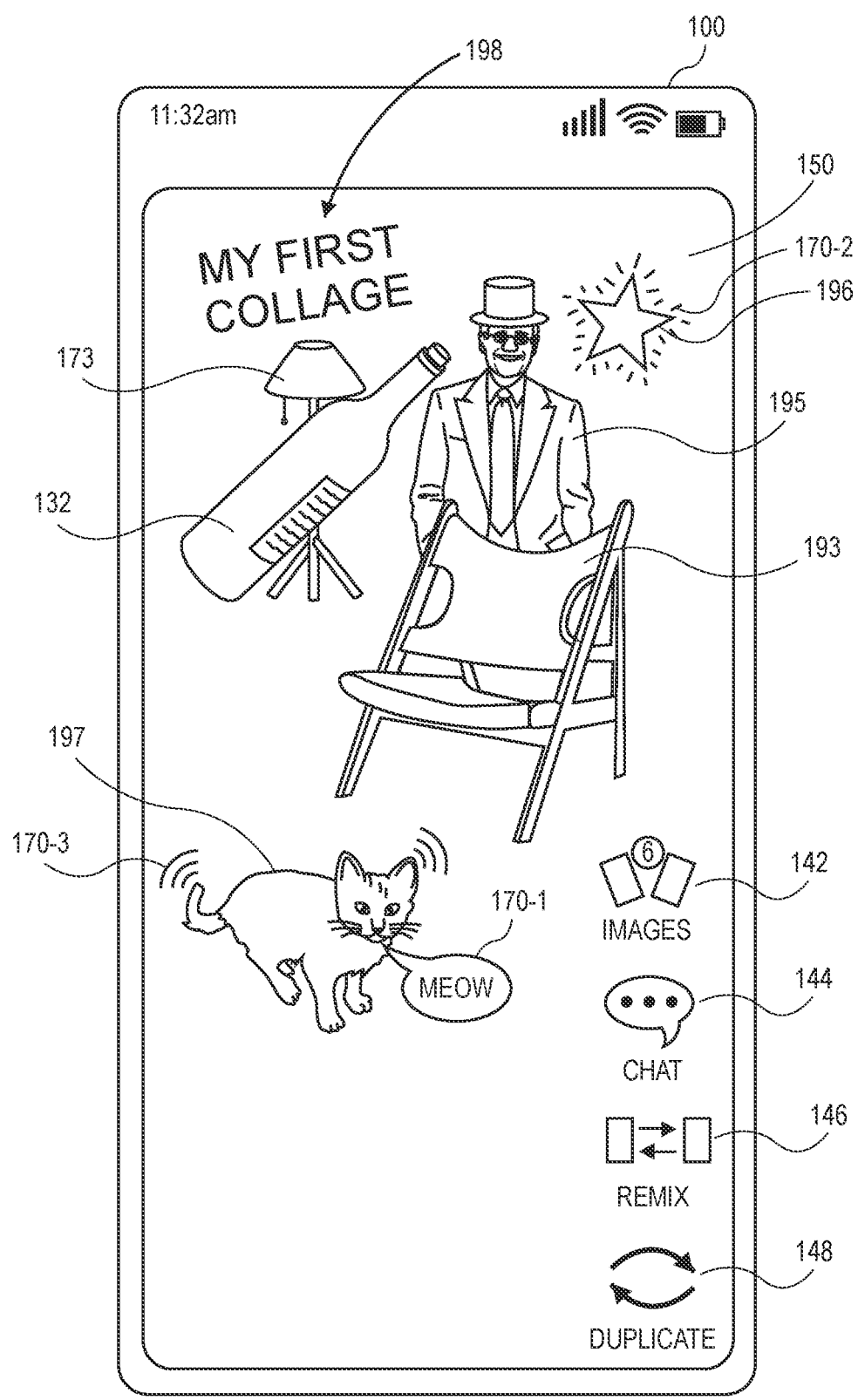

A user may go through the process of extracting image segments and including extracted images segments onto the collage 150 for any number of extracted image segments, each of which may be placed anywhere on the collage. Likewise, in some implementations, the user may draw or write on the collage and/or choose to animate one or more of the extracted image segments. Referring to FIG. 1N, illustrated is a collage that includes six extracted image segments 132, 173, 193, 195, 196, 197, and a typed note 198 ("MY FIRST COLLAGE") added by the user. Likewise, the user has selected animation 170-2 for the star extracted image segment 196 so that the star extracted image segment has a flashing animation effect. Additionally, the user has added animation to the cat extracted image segment 197 that includes both movement 170-3 of the cat extracted image segment 197 and audio (e.g., "MEOW") animation 170-1. Any of a variety of forms of animation may be added to an extracted image segment included on a collage. For example, animation may include, but is not limited to, color changes, movement, flashing, sound, haptics, etc.

FIG. 1O is an example illustration of the collage 150 illustrated in FIG. 1N after selection of the remix control 146, in accordance with disclosed implementations.

As illustrated, in response to selection of the remix control 146, the position of the extracted image segments 132, 173, 193, 195, 196, 197 on the collage and with respect to each other having been re-arranged or remixed. In some implementations, the rearrangement or remixing of the extracted image segments may be random. In other implementations, rearrangement may be based on, for example, a popularity of the extracted images segments, user preference, cross-pattern configuration, layout, etc.

Figure 2:
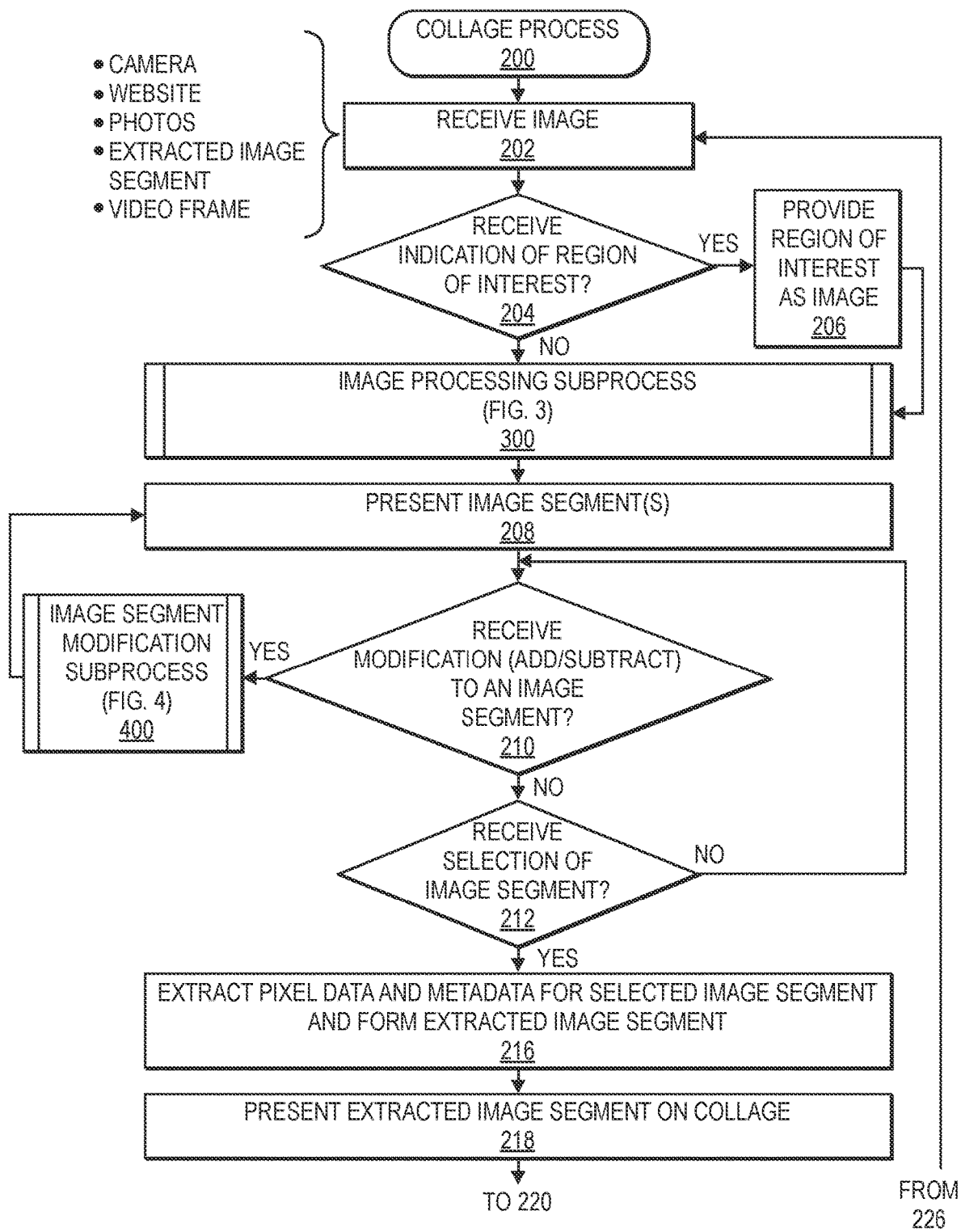
FIG. 2 is an example collage process, in accordance with disclosed implementations.
Figure 2:
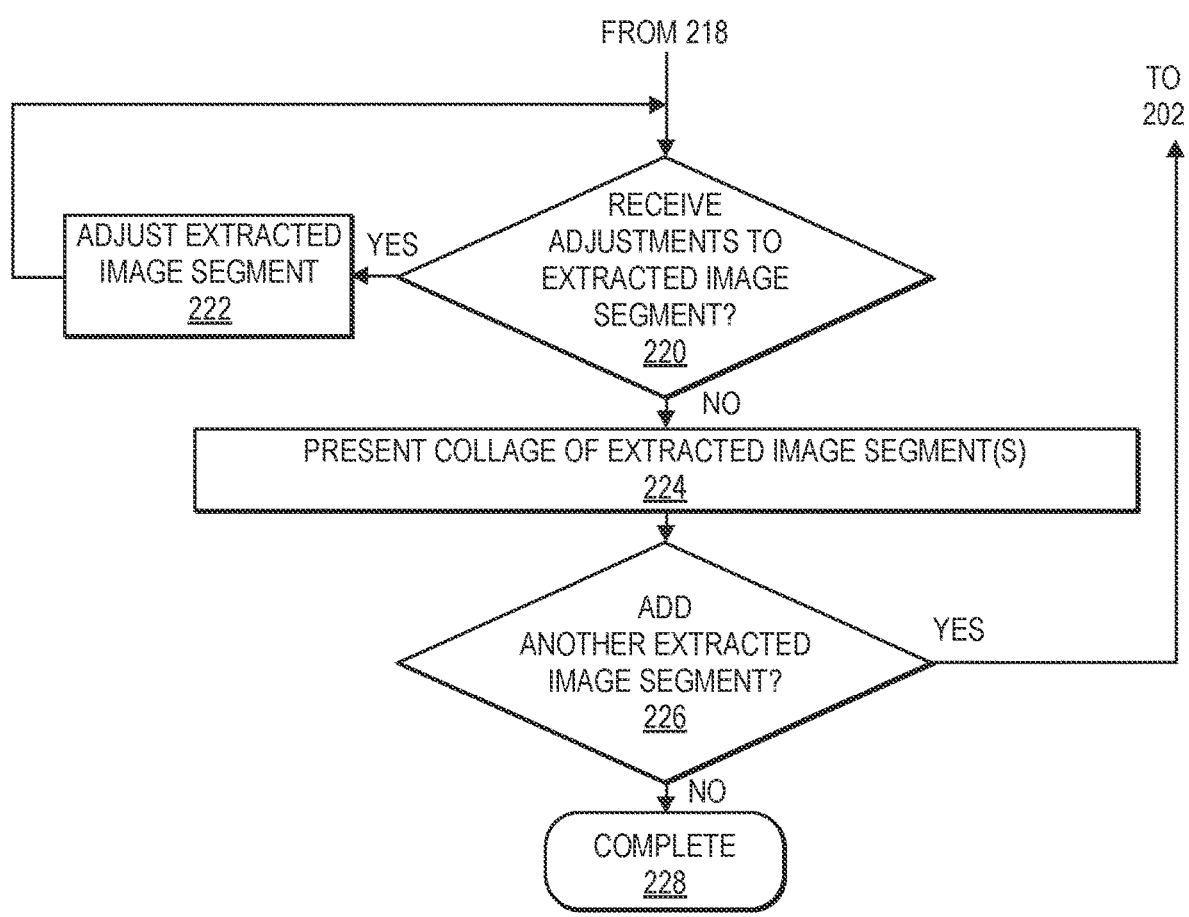

FIG. 2 is an example collage process 200, in accordance with disclosed implementations.

The example process 200 begins upon receipt of an image, as in 202. As discussed above, the image can be from any source such as a camera or other imaging element, from a website, from photos stored in a memory of a user device or stored in memory that is accessible by the user device (local or remote), a video frame from a video, etc. Likewise, in some implementations, the image received by the example process may already be an extracted image segment. For example, in some implementations, the popularity or frequency of extracted image segments used on other collages by the same or other users may be monitored and popular or trending extracted image segments presented to a user for selection and inclusion in the collage. Alternatively, or in addition thereto, and as another example, existing extracted image segments that are similar to other extracted image segments included in a collage by a user and/or that are determined to be of potential interest to the user may be presented and/or selected by the user as the image.

A determination may then be made as to whether a region of interest is indicated by the user, as in 204. For example, in addition to receiving an image, a user may indicate, for example through interaction with the image, a region or portion of the image that is of interest to the user. If it is determined that a region of interest is indicated, the portion of the image included in the indicated region of interest is provided as the image, as in 206. If it is determined that a region of interest is not provided, or after providing the portion of the image included in an indicated region of interest as the image, the example image processing subprocess 300 is performed on the image, as in 300. The example image processing subprocess 300 is discussed in more detail below with respect to FIG. 3. As discussed below, the image processing subprocess 300 generates and returns one or more image segments of an image, each image segment corresponding to an object represented in the image. In some implementations, the image processing subprocess 300 may be performed independent of the example process 200 such that image segments are already determined for and associated with an image. In such an example, upon receipt of the image, the image segments already determined for the image may be utilized without again processing the image with the image processing subprocess.

One or more of the image segments returned by the image processing subprocess may then be presented to a user such that the image segment(s) are distinguished from the rest of the image, as in 208. An example of a presentation of an image segment such that the image segment is distinguished from other portions of the image is illustrated in FIGS. 1B, 1F, 1K, and 1L, and discussed above. In some implementations, all image segments determined for an image may be presented to the user as distinguished from other portions of the image. In other examples, only a subset (e.g., 3-5) of the image segments determined for an image may be presented to the user as distinguished from other portions of the image. In still other examples, only a single image segment, such as a primary or central image segment of the image, may be presented to the user as distinguished from other portions of the image.

After presenting the image segment(s), a determination is made as to whether a modification to a presented image segment has been received, as in 210. As discussed above with respect to FIGS. 1F, 1K, and 1L, a user may interact with an image segment to modify to the image segment to include/exclude pixels from the image segment. For example, if initial processing of the image inaccurately included/excluded a portion of an object represented in an image segment, a user may interact with the image segment to adjust the pixels included/excluded from the image segment such that the image segment corresponds to the object of the image segment.

Figure 4:
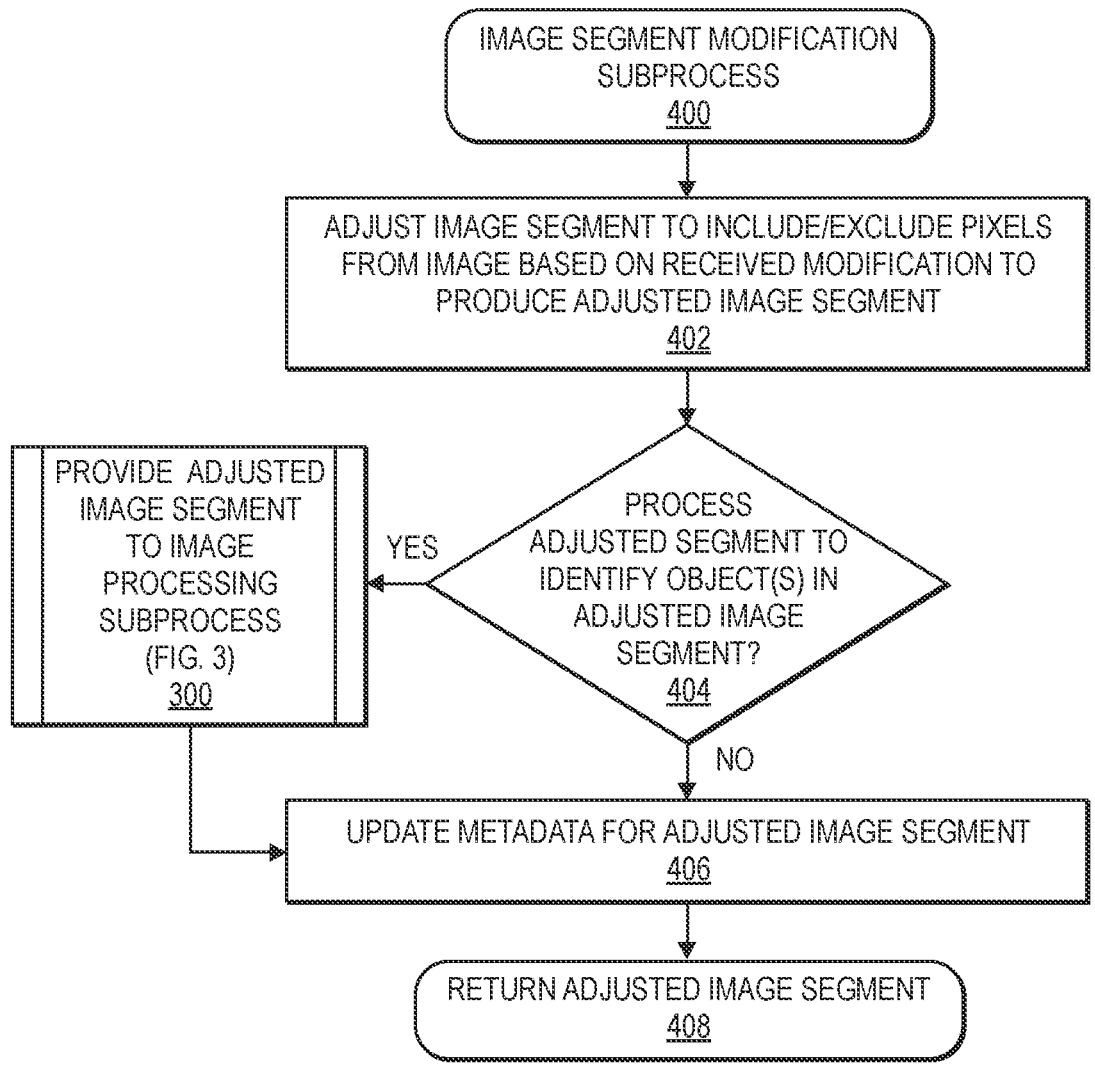
FIG. 4 is an example image segment modification subprocess, in accordance with disclosed implementations.

If it is determined that a modification to the image segment is received, the example image segment modification subprocess may be performed, as in 400 (FIG. 4). The example image segment modification subprocess 400 is discussed further below with respect to FIG. 4. Upon completion of the image segment modification subprocess 400, the example process 200 returns to block 208 and continues.

If it is determined that a modification to an image segment is not received, a determination is made as to whether a selection of an image segment of the image has been received, as in 212. If a selection of an image segment has not been received, the example process 200 returns to block 210 and continues. If a selection of an image segment is received, pixel data of the selected image segment and corresponding metadata are extracted and used to create an extracted image segment for the selected image segment, as in 216. As discussed above, the metadata may include, but is not limited to, an indication of the image from which the image segment was extracted, the location of the image from which the image segment was extracted, a link to a website from which the object represented by the extracted image segment can be purchased or obtained, additional information about the object, reviews of the object, a link to a second collage from which the image or the extracted image segment was obtained, a popularity of the extracted image segment, an indication of a user that created the extracted image segment, etc. The metadata included in the extracted image segment may be used for attribution information with respect to the extracted image segment, to enable purchase of the object represented in the extracted image segment, etc.

The extracted image segment may also be presented on a collage, as in 218. If this is the first extracted image segment of the collage, the extracted image segment may be presented on a blank collage. If other extracted image segments are already included on the collage, the extracted image segment may be initially presented in the center of the collage such that the user can adjust the size, orientation, position, etc., of the image in the collage.

After presenting the extracted image segment on the collage, a determination is made as to whether any adjustments to the extracted image segment have been received, as in 220. Adjustments may include, for example, adjustments to the size, position, orientation, and/or rotation of the extracted image segment, and/or animation of the extracted image segment.

If it is determined that an adjustment to the extracted image segment has been received, the extracted image segment is adjusted in accordance with the received adjustment, as in 222. After adjusting the extracted image segment, the example process 200 returns to decision block 220 and continues. If it is determined that an adjustment to the extracted image segment has not been received, the collage of extracted image segments is presented, as in 224, and a determination is made as to whether another extracted image segment is to be added to the collage, as in 226. As discussed, any number of extracted image segments may be added to a collage. If it is determined that another extracted image segment is to be added to the collage, the example process 200 returns to block 202 and continues with receipt of another image. If it is determined that another extracted image segment is not to be added to the collage, the example process 200 completes, as in 228.

Figure 3:
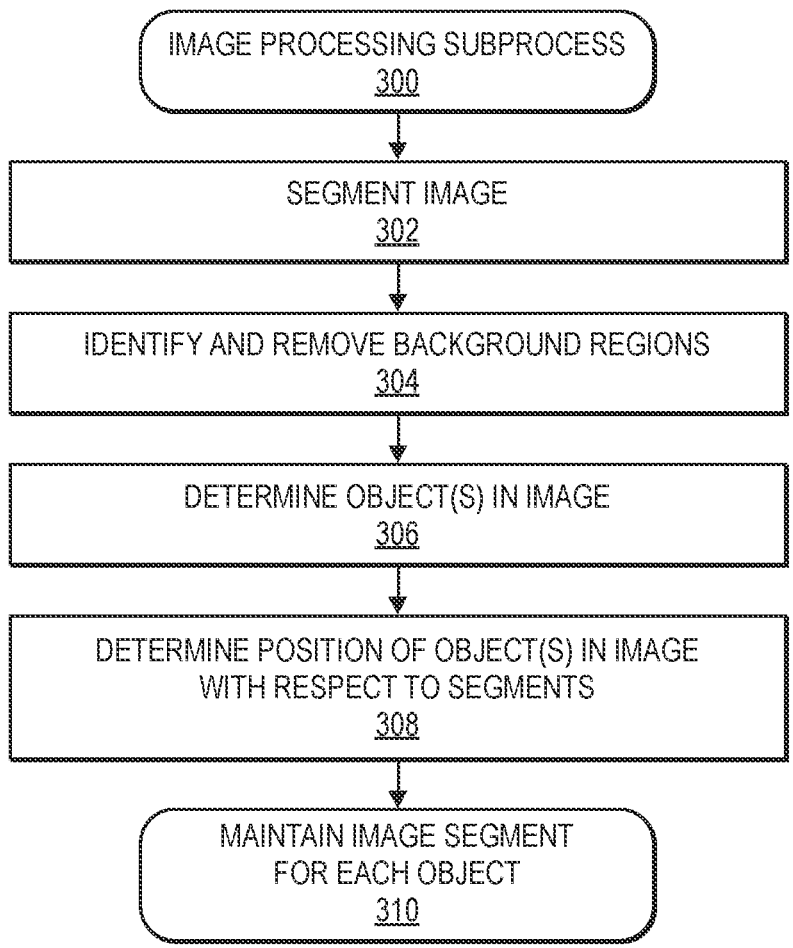
FIG. 3 is an example image processing subprocess, in accordance with disclosed implementations.

FIG. 3 is an example image processing subprocess 300, in accordance with disclosed implementations.

The example subprocess 300 begins by segmenting an image, in 302. Any variety of segmentation techniques, such as circle packing algorithm, super-pixels, etc., may be used. The segments may then be processed to remove background portions of the image from consideration, in 304. Determining background segments may be done, for example, using a combination of attentive constraints (e.g., salient objects are likely to be at the center of the image) and unique constraints (e.g., salient objects are likely to be different from the background). In one implementation, for each segment ($S_i$), a unique constraint may be computed using a combination of color, texture, shape and/or other feature detection. The pairwise Euclidian distances for all pairs of segments: $L2(S_i, S_j)$ may also be computed for $\forall S_i \in S$, $\forall S_j \in S$. The unique constraint U for segment $S_i$, or $U_i$, may be computed as $U_i = \Sigma_j L2(S_i, S_j)$. The attentive constraint for each Segment $S_i$ may be computed as $A=[X(s)-X']^2+[Y(s)-Y']^2$, where X' and Y' are the center coordinates of the image.

One or more of the segments S', a subset of S, may then be selected such that $U(s)-A(s)>t$, where t is a threshold set manually or learned from the data. The threshold t may be any defined number or amount utilized to distinguish segments as background information or potential objects. Alternatively, Similarity ($s_i' \in S'$, $r_i \in R-$) and Similarity ($s_i' \in S'$, $r_i \in R+$), where $s_i'$ is an element of S' and $r_i$ is an element R–, and R– is a set of image non-salient regions (background), may be computed and used as the similarity between each segment to a labelled database of labelled salient segments and non-salient segments.

Returning to FIG. 3, upon removing the background segments, the objects remaining in the image are determined, in 306. Objects remaining in the image may be determined, for example, by using a sliding window approach to compute the score of each possible hypothesis of the location of the object. Using approaches such as boosted selection of Haar-like wavelets, or multiple-parts based models, each segment may be processed to determine potentially matching objects. For example, an image vector may be determined for a segment and compared to information stored for objects. Based on the image vector and the stored information, a determination may be made as to how similar the image vector is to the stored information for particular objects.

The DNN may perform a sliding window approach N times, each with a different trained object classifier (e.g., person, bag, shoes, face, arms, etc.). After determining a hypothesis for each object classifier, the output is a set of best hypotheses for each object class. Because objects do not generally appear randomly in images (e.g., eyes and noses typically appear together), position-sensitive constraints may also be considered. For example, positions of the root object (e.g., person) may be defined as W (root) and each geometric constraint for each object k may be denoted with respect to each other as $\vec{\lambda_k}(O)$, a 6-element vector. The geometric "fit" of each landmark $W_{oi}$ with respect to the root object $W_{root}$ may be defined by $Ł(\vec{\lambda}(i)(W_o)*\Theta)$, $\Theta_i=[dy, dx^2, dy^2, dxdy, z]$, where dx, dy are the average geometric distance between each pixel in the object box $W_{oi}$ and each pixel in the root object box. The problem of finding optimal $\vec{\lambda_k}$ can be formulated as, arg min $\lambda_i Ł(\vec{\lambda}(i)*D_{train}(\Theta_i))$ where $D_{train}(\Theta_i)$ is the observed value of E in training images.

To optimize this function, the location of the objects in the image may be determined, in 308. For example, the center of a root object (e.g., person) in the image is marked as (0, 0), and the location of other objects in the processed images is shifted with respect to the root object. A linear-Support Vector Machine (SVM) is then applied with $\Theta_i$ as parameters. The input to the SVM is $D_{train}(\Theta_i)$. Other optimizing approaches, such as linear programming, dynamic programming, convex optimizations, and the like, may also be used alone or in combination with the optimization discussed herein. The training data $D_{train}(\Theta_k)$, can be collected by having users place a bounding box on top of both the entire object and the landmarks. Alternatively, semi-automated approaches, such as facial detection algorithms, edge detection algorithms, etc., may be utilized to identify objects. In some implementations, other shapes, such as ovals, ellipses, and/or irregular shapes may be used to represent objects.

Finally, image segments for each detected object are maintained, as in 310. As will be appreciated, the example subprocess 300 of processing images may be performed by a trained DNN that processes an image to generate image segments corresponding to objects represented in the image. For example, a DNN such as a convolution neural network may be trained, for example using labeled and/or unlabeled data, to process an input image and output one or more image segments of the image corresponding to objects detected in the image. Likewise, as discussed further below, as image segments are adjusted by users, those adjusted image segments and corresponding images may be utilized as additional labeled training data to continue training the DNN, thereby further improving the accuracy of the DNN based on user provided inputs.

FIG. 4 is an example image segment modification subprocess 400, in accordance with disclosed implementations.

The example process 400 begins by adjusting the image segment based on user input, such as through a touch-based display, to include and/or exclude pixels from the image, thereby generating an adjusted image segment, as in 402. For example, as discussed above with respect to FIGS. 1K and 1L, a user may interact with the disclosed implementations to add pixels to an image segment, remove pixels from the image segment originally determined and presented to the user, and/or remove an object from the image by replacing pixel values using an in-fill or in-painting process. For example, as illustrated in FIGS. 1K and 1L, the originally determined image segment 182-2 for the chair excluded pixels of the image that represent the rear leg 183-3 of the chair. Likewise, the original image segment included pixels of the image corresponding to the space 182-4 between the seat of the chair and the back of the chair. A user may interact with the presentation of the image to include pixels corresponding to the rear leg 182-3 of the chair in the image segment 182-2 and exclude pixels corresponding to the space 182-4 between the back of the chair and the seat of the chair.

A determination may then be made as to whether the adjusted segment is to be again processed to identify object(s) included in the adjusted image segment, as in 404. If it is determined that the adjusted image segment is to be processed to determine the object included in the image segment, the example image processing subprocess 300 discussed above with respect to FIG. 3 is performed with the adjusted image segment.

After processing the adjusted image segment or if it is determined that the adjusted image segment is not to be again processed, metadata for the adjusted image segment is updated to include/exclude an indication of the pixels to/from the metadata, as in 406. Likewise, if the image is processed again, information resultant from the example process 300 may be updated in the metadata for the image segment. Finally, the adjusted image segment, or data corresponding to the adjusted image segment is returned, as in 408.

Figure 5:
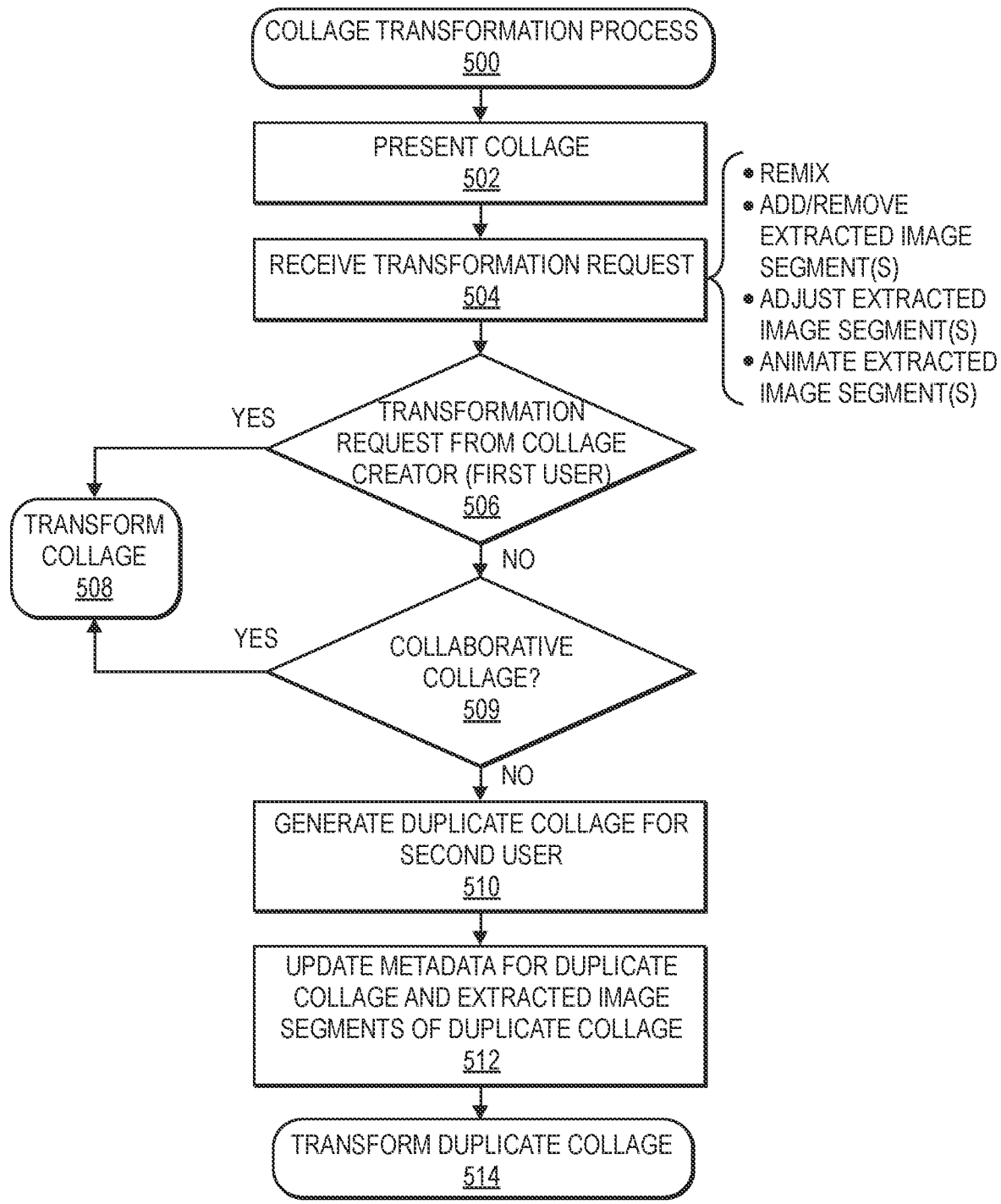
FIG. 5 is an example collage transformation process, in accordance with disclosed implementations.

FIG. 5 is an example collage transformation process 500, in accordance with disclosed implementations.

The example collage transformation process 500 begins by presenting a collage that includes one or more extracted image segments, as in 502. For example, a collage, such as the collage 150 illustrated and discussed above with respect to FIG. 1N, which includes six image segments and a text input, may be presented to a user. In some implementations, a collage may be designed as private such that only the user that created the collage may view and/or transfer the collage. In other implementations, the user may designate the collage as collaborative and invite other users to view and/or collaborate on the collage. Collaboration between users and a collage may be in real-time or near real-time such that each of the users collaborating on the collage can see changes to the collage and/or chat about the collage/changes to the collage. In other examples, collaboration may be incremental such that a second user may transform the collage and the first user may later view the collage and see the changes made by the second user.

In still other examples, the user may make the collage public such that any user may view the collage. A collaborative collage is a collage in which an invited user, or if allowed by the collage creator, any other users other than the creator of the collage, may modify the collage.

After presenting the collage, a transformation request to transform one or more aspects of the collage may be received, as in 504. A transformation request may be any input to transform one or more aspects of the collage, such as an extracted image segment of the collage. For example, a transformation request may include, but is not limited to, a request to remix the visual placement and presentation of the extracted image segments of the collage, a request to add an extracted image segment to the collage, a request to remove an extracted image segment from the collage, a request to adjust a size, shape, and/or position of an extracted image segment of the collage, a request to add, remove, or change an animation of an extracted image segment of the collage, etc.

In response to receiving the transformation request, a determination is made as to whether the transformation request is from the creator of the collage (a first user), as in 506. For example, a user identifier or user identifier that is associated with an application executing on a user device that is used to create the collage may be indicated as the creator of the collage. If the user is utilizing the same user device, another user device associated with the user or the user account, or otherwise accessing the user account, it may be determined that the transformation request was from the creator of the collage.

If it is determined that the request is from the creator of the collage, the collage is transformed in accordance with the transformation request, as in 508. If it is determined that the transformation request is not from the creator of the collage, a determination is made as to whether the collage is a collaborative collage, as in 509. As noted above, the creator of a collage may indicate a collage as collaborative such that other users may transform the collage. In such an example, the collage may be transformed by the user and/or other users and those transformations to the collage may be presented to the user and/or the other users. If it is determined that the collage is a collaborative collage, the collage is transformed in accordance with the transformation request, as in 508. In some implementations, the user may specify which other users may transform the collage, such that the collage is only considered a collaborative collage for those specific users. For any other user that submits a transformation request to the collage, a duplicate collage may be generated, as discussed below, for which the transformation request may be applied such that the transformation does not impact the collage generated by the user.

If it is determined that the collage is not a collaborative collage or not a collaborative collage for the user that submitted the transformation request, a duplicate collage is generated for the other user, referred to herein as a second user, as in 510. A duplicate massage may include the same extracted image segments in the same position, orientation, size, etc., as the collage such that the user transforming the collage cannot determine the difference between the duplicate collage and the collage. However, the metadata of the collage and each extracted image segment may be updated to indicate that the collage is a duplicate collage and include information, a link, and/or other reference to the collage from which the duplicate was generated, as in 512. Likewise, the metadata of each extracted image segment may be updated to indicate the original collage as a source of the extracted image segment. Such information may be in addition to any source information already included in the metadata for the original collage and/or the extracted image segments.

Finally, the duplicate collage may be transformed in accordance with the received transformation request, as in 514. The duplicate collage becomes another collage maintained by the system, the second user is identified as the creator of the duplicate collage, and there is a link or other reference maintained between the duplicate collage, the original collage, as well as any other source information for extracted image segments included in the collage and/or the duplicate collage. Likewise, the second user may transform the duplicate collage without transforming the original collage. In addition, the second user may also specify the duplicate collage as a private collage, a duplicate collage, etc., just as if the second user had been the original creator of the duplicate collage.

Figure 6:
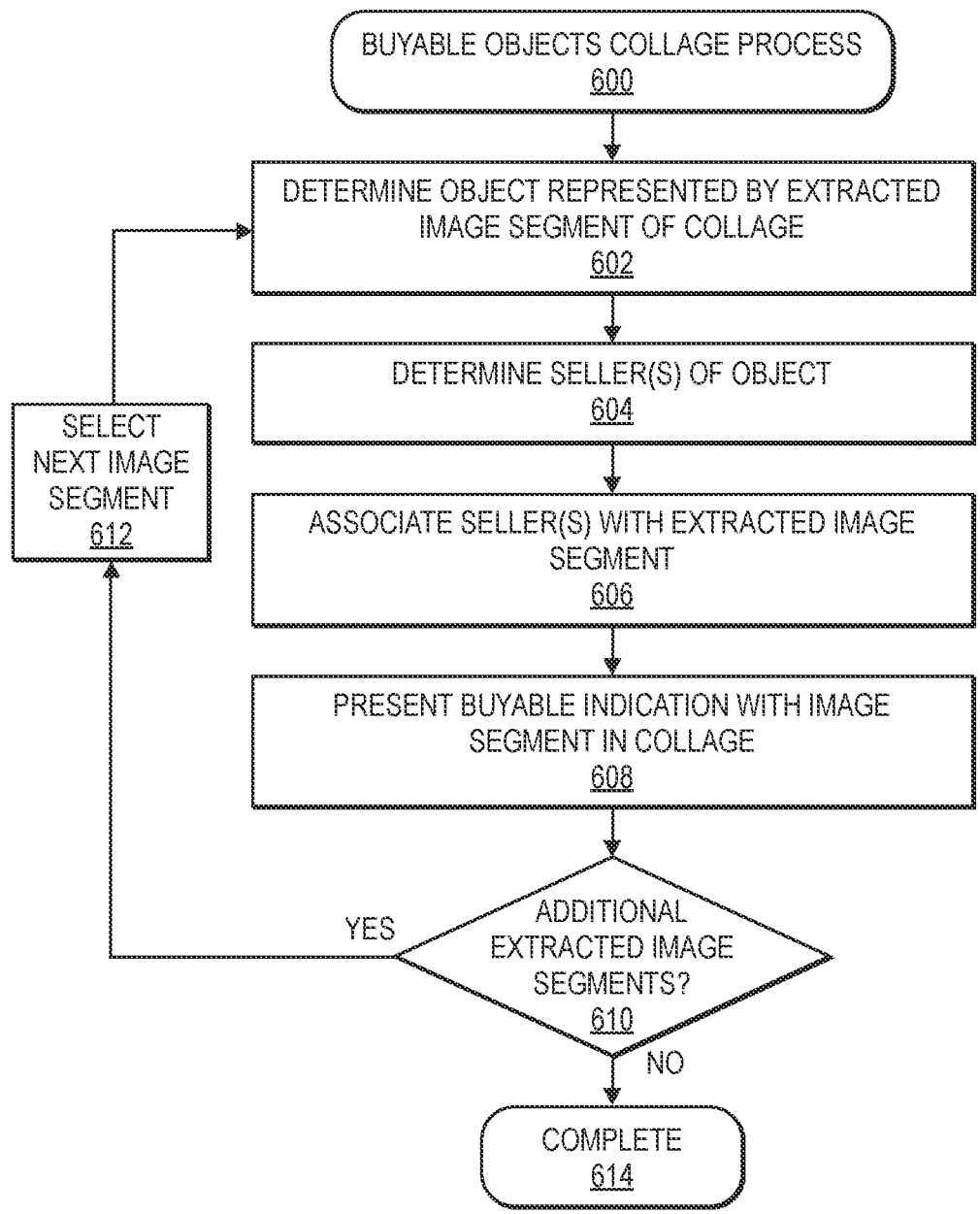
FIG. 6 is an example buyable objects collage process, in accordance with disclosed implementations.

FIG. 6 is an example buyable objects collage process 600, in accordance with disclosed implementations.

The example process 600 begins by determining an object represented by an extracted image segment that is included in a collage, as in 602. For example, any of a plurality of image processing algorithms or DNNs may be utilized to process an image and detect an object, or an object type represented in the image. Alternatively, or in addition thereto, metadata about the extracted image segment may be utilized to determine an object represented in the extracted image segment. For example, if the extracted image segment is originally obtained from a website, the metadata of that extracted image segment may include an indication of the object represented in the extracted image segment.

In addition to determining the object represented in the extracted image segment, one or more sellers of the object may be determined, as in 604. For example, if the extracted image segment was originally obtained from a website, such as an e-commerce website, metadata of the extracted image segment may indicate the seller of the object. In other examples, sellers of objects may provide information, such as catalogs indicating objects offered for sale by that seller. In still other examples, websites of sellers may be processed to determine objects offered for sale by those sellers and that information used to determine one or more sellers of the object represented in the extracted image segment. In still another example, a seller or other user may provide an indication of the seller of the object represented in the image segment.

Each determined seller may then be associated with the extracted image segment, as in 606. For example, if the seller corresponds to an e-commerce website, a detail page for the object may be associated with the extracted image segment, thereby indicating the seller of the object.

Figure 7A:
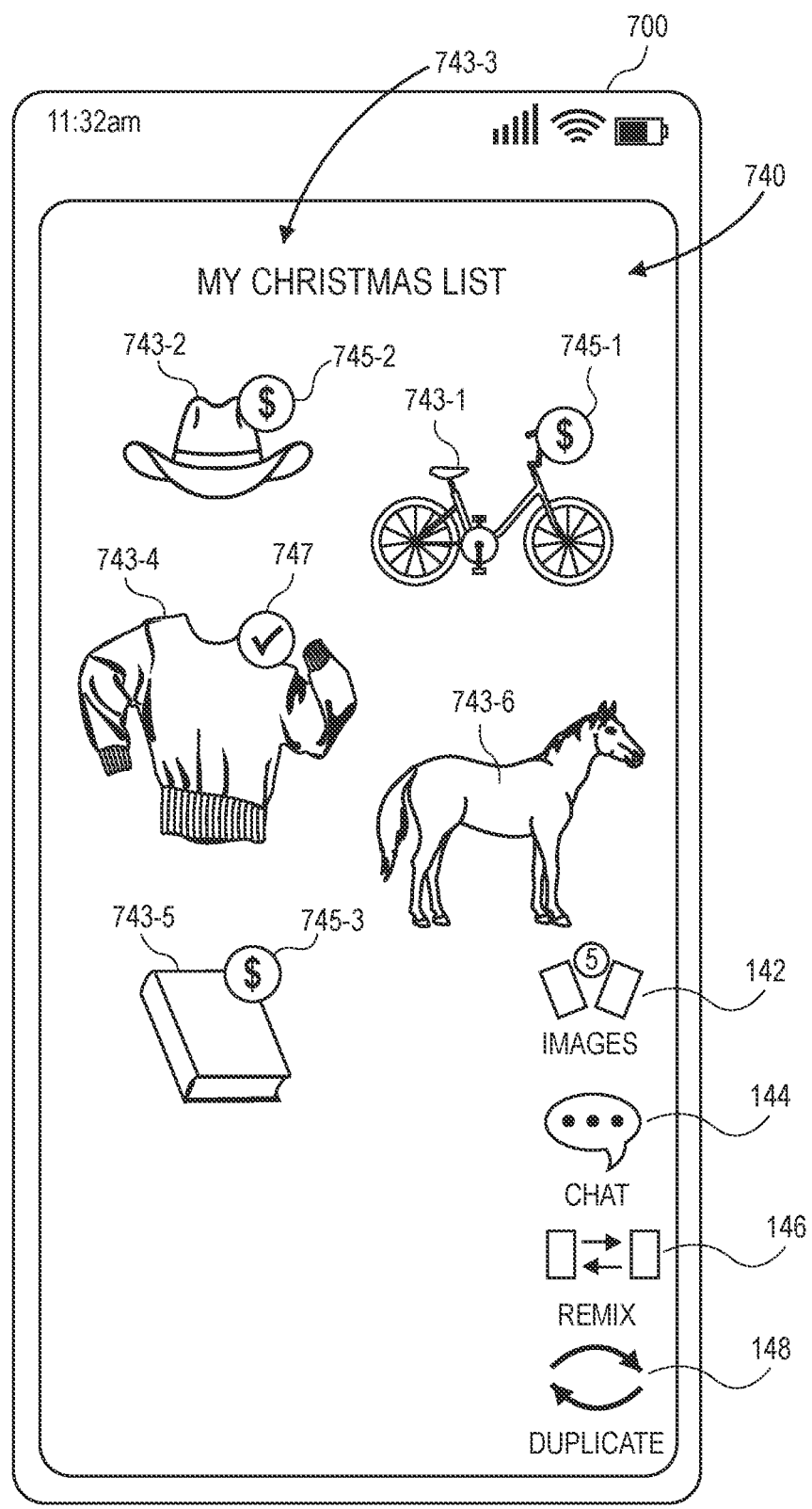
FIG. 7A is an example buyable objects collage, in accordance with disclosed implementations.

In response to determining one or more sellers of the object represented in the image segment, a buyable indication may be presented with the extracted image segment as part of the collage, as in 608. For example, FIG. 7A is an illustration of a collage 740 presented on a user device 700 that includes buyable indicators, in accordance with the disclosed implementations. In this example, the collage 740 includes five extracted image segments 743-1, 743-2, 743-4, 743-5, 743-6, and a typed text input 743-3 of "MY CHRISTMAS LIST." The extracted image segments of the collage 740 may be processed by the example process 600 and a determination made that extracted image segments 743-1 (bicycle), 743-2 (cowboy hat), and 743-5 (book) correspond to buyable objects. As such, a buyable indication 745-1, 745-2, and 745-3 are presented next to the respective extracted image segment. In this example, the object of a sweater that is represented by the extracted image segment 743-4 may have been previously indicated as buyable and now indicated as purchased, through presentation of the purchased indicator 747. For example, if the user that created the collage purchases an object represented by an extracted image segment, the buyable indicator for that extracted image segment may be replaced with a purchased indicator 747, indicating that the item has been purchased.

In other examples, a collage may be created by a first user and shared with other users to indicate items the first user would like to receive, such as Christmas gifts, birthday gifts, wedding gifts, etc., in accordance with the disclosed implementations. In such an example, the collage may be shared with one or more other users. The one or more other users may interact with the collage 740 and optionally purchase items corresponding to extracted image segments included in the collage. In such an example, as items are purchased or otherwise obtained, the buyable indicator may change to a purchased indicator, thereby indicating to other users that the item has already been purchased for the first user.

Returning to FIG. 6, after presenting a buyable indicator in the collage with the corresponding extracted image segment, a determination may be made as to whether another extracted image segment of the collage remains that is to be processed by the example process 600, as in 610. If it is determined that additional extracted image segments of the collage remain, a next extracted image segment is selected, as in 612, the example process 600 returns to block 602, and continues. If it is determined that no additional extracted image segments of the collage remain, the example process 600 completes, as in 614.

In some implementations, if a user selects one of the extracted image segments that are indicated as buyable, such as the extracted image segment 743-1, a buyable object detail page corresponding to the object represented by the extracted image segment may be presented.

Figure 7B:
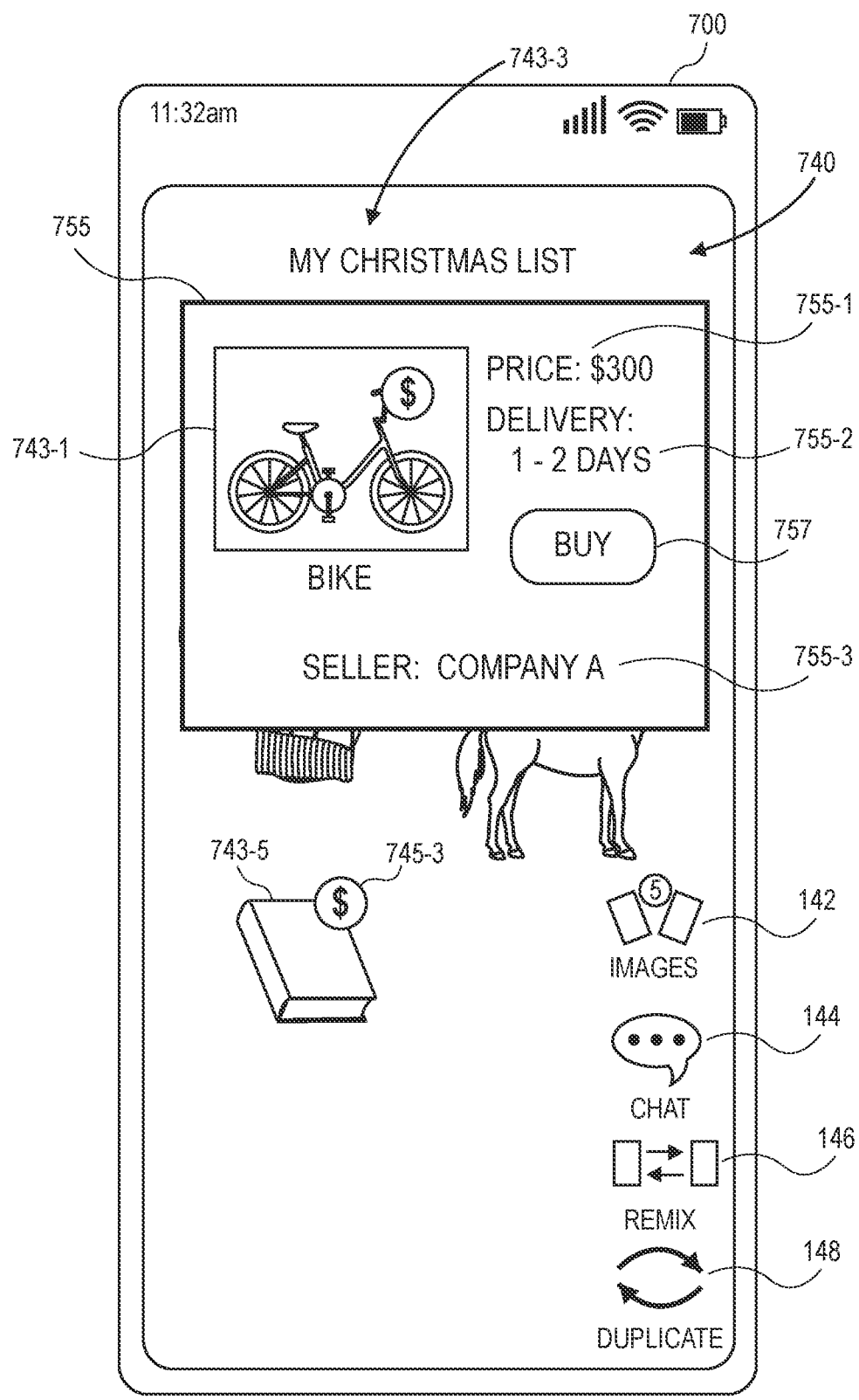
FIG. 7B is an example buyable object detail page, in accordance with disclosed implementations.

For example, FIG. 7B is an example buyable object detail page, in accordance with disclosed implementations. In particular, in response to a user selecting the extracted image segment 743-1 of the bicycle, the buyable object detail page 755 is presented that includes additional information about the object represented by the selected extracted image segment, in this example the extracted image segment 743-1. For example, the buyable object detail page 755 may include an indication of the price 755-1 of the object, a delivery timeframe 755-2 of the object when purchased, a seller 755-3 of the object, etc. Additionally, the buyable object detail page 755 may include a purchase control, such as a "Buy" button 757 that, when selected, enables a purchase of the object represented by the extracted image segment 743-1 from the seller 755-3, in this example, Company A.

Figure 8:
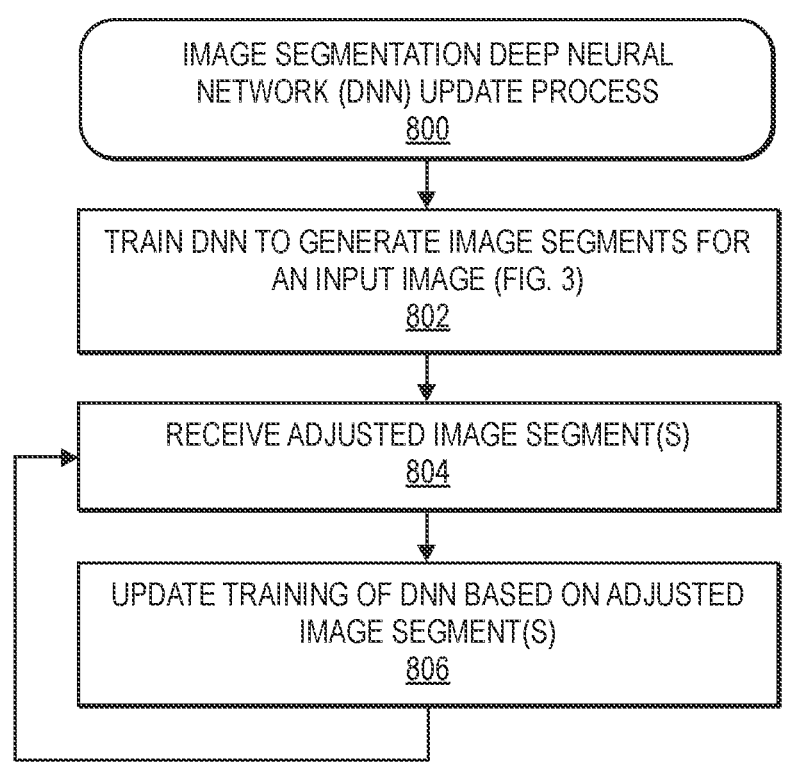
FIG. 8 is an example image segmentation deep neural network update process, in accordance with disclosed implementations.

FIG. 8 is an example image segmentation deep neural network update process 800, in accordance with disclosed implementations. As discussed above, in some implementations, the DNN used to determine image segments of an image may be continually or periodically updated as image segments are adjusted by users to include/exclude pixels of those image segments. In some implementations, if an image segment is adjusted on a user device, the adjusted image segment may be sent to a remote computing resource and compiled with other user feedback (other image segment adjustments) and the adjusted image segments used for ongoing training to update the DNN. As a DNN is updated, the updated DNN may be sent to user devices for operation on those user devices. Alternatively, the updated DNN may reside on one or more remote computing resources and operate on those remote computing resources.

The example process 800 begins by initially training a DNN to generate one or more image segments for an input image, as in 802. In some implementations, the DNN may be trained to perform the image processing subprocess 300 discussed above with respect to FIG. 3. In other implementations, other training techniques or processes may be used to train a DNN to receive an input image and determine one or more image segments corresponding to objects represented in the input image.

At some point after the DNN is initially trained, one or more adjusted image segments may be obtained based on user input that caused the adjustment to image segments originally determined by the DNN, as in 804. With a significantly large set of users, a large set of adjusted image segments may be received as different users interact with images and image segments determined and presented in accordance with the disclosed implementations.

The adjusted image segments and the corresponding image may be utilized as labeled training data for the DNN. Accordingly, the adjusted image segments may be used to update the DNN, as in 806.

Figure 9:
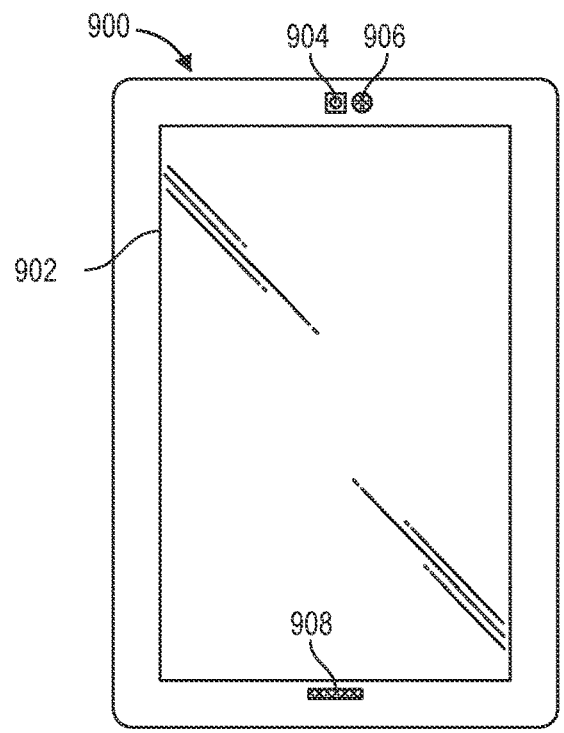
FIG. 9 illustrates an example computing device, in accordance with disclosed implementations.
Figure 10:
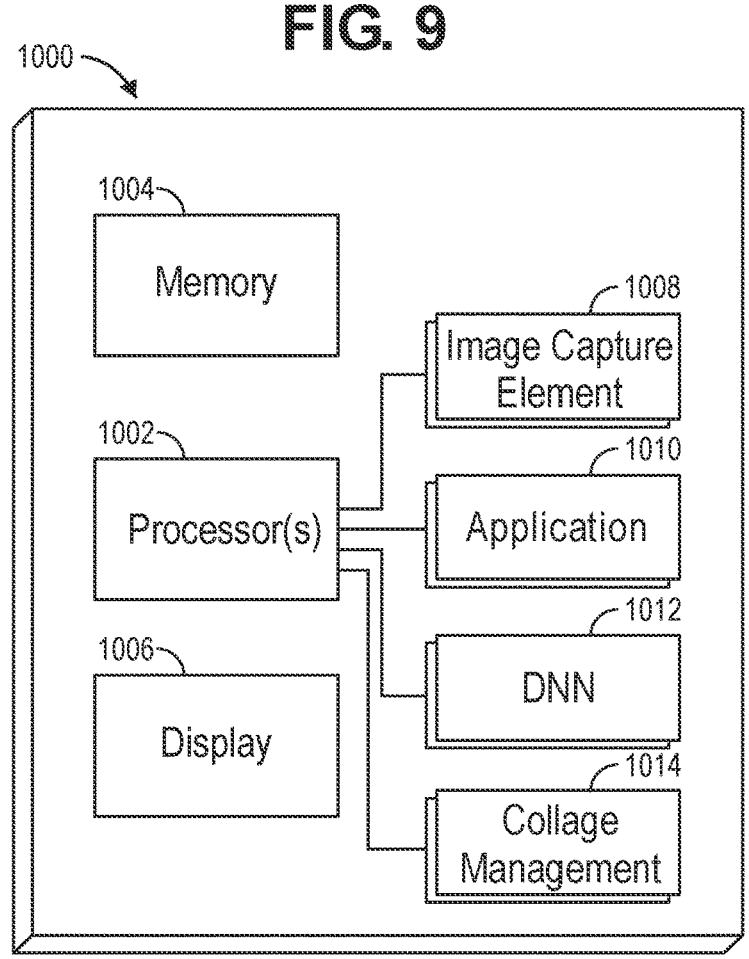

FIG. 9 illustrates an example user device 900 that can be used in accordance with various implementations described herein. In this example, the user device 900 includes a display 902 and optionally at least one input component 904, such as a camera, on a same side and/or opposite side of the device as the display 902. The user device 900 may also include an audio transducer, such as a speaker 906, and optionally a microphone 908. Generally, the user device 900 may have any form of input/output components that allow a user to interact with the user device 900. For example, the various input components for enabling user interaction with the device may include a touch-based display 902 (e.g., resistive, capacitive, Interpolating Force-Sensitive Resistance (IFSR)), camera (for gesture tracking, etc.), microphone, global positioning system (GPS), compass or any combination thereof. One or more of these input components may be included on a user device or otherwise in communication with the user device. Various other input components and combinations of input components can be used as well within the scope of the various implementations as should be apparent in light of the teachings and suggestions contained herein.

Figure 10:
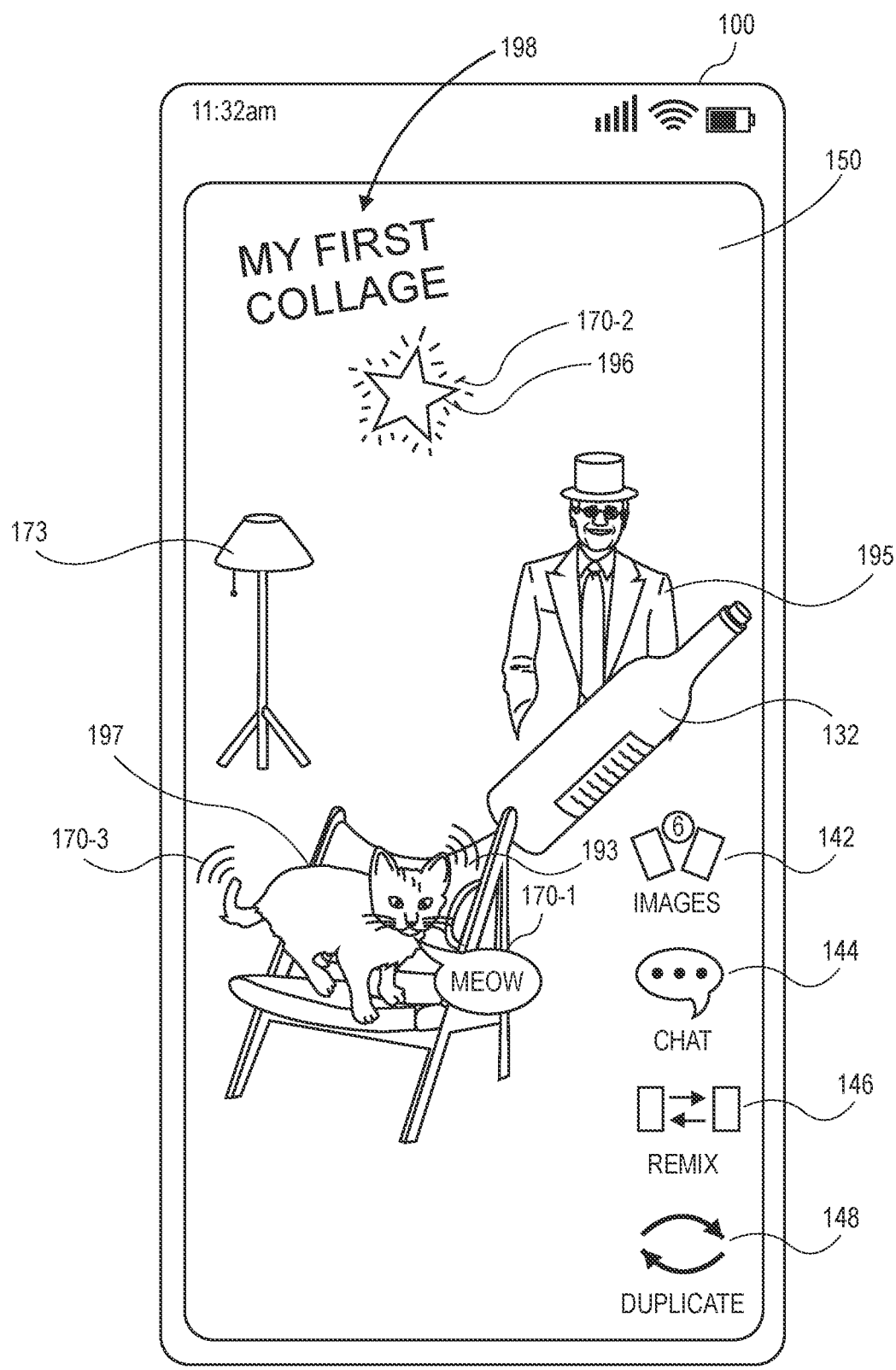
FIG. 10 illustrates an example configuration of components of a computing device, such as that illustrated in FIG. 9.

In order to provide the various functionality described herein, FIG. 10 illustrates an example set of basic components 1000 of a user device, such as the user device 900 described with respect to FIG. 9 and discussed herein. In this example, the device includes one or more processors 1002 for executing instructions that can be stored in at least one memory device or element 1004. As would be apparent to one of ordinary skill in the art, the device can include many types of memory, data storage or computer-readable storage media, such as a first data storage for program instruction for execution by the one or more processors 1002. Removable storage memory can be available for sharing information with other devices, etc. The device typically will include some type of display 1006, such as a touch-based display, electronic ink (e-ink), organic light emitting diode (OLED), liquid crystal display (LCD), etc.

As discussed, the device in many implementations will include at least one image capture element 1008, such as one or more cameras that are able to image objects in the vicinity of the device. An image capture element can include, or be based at least in part upon, any appropriate technology, such as a CCD or CMOS image capture element having a determined resolution, focal range, viewable area, and capture rate. The device can include at least one application component 1010 for performing the implementations discussed herein, such as the generation of collages. The user device may be in constant or intermittent communication with one or more remote computing resources and may exchange information, such as collages, extracted image segments, transformed image segments, metadata, updated DNNs, etc., with the remote computing system(s) as part of the disclosed implementations.

The device also can include at least one location component, such as GPS, NFC location tracking, Wi-Fi location monitoring, etc. Location information obtained by the location component may be used with the various implementations discussed herein as a factor in, for example, determining a seller of an object represented in an extracted image segment. For example, if the user is located in a Store A department store and generates an extracted image segment from an image generated by the image capture element 1008 of the user device while located in the Store A department store, the location information may be used as a factor in determining a seller of an object represented in the extracted image segment.

The user device may also include a DNN 1012, as discussed herein, that is operable to receive an image as an input and determine one or more image segments corresponding to objects represented in the input image. Likewise, the user device may also include a collage management component 1014 that maintains, for example, collages created and/or viewed by the user of the user device, extracted image segments, etc., and/or performs some or all of the implementations discussed herein.

The example user device may also include at least one additional input device able to receive conventional input from a user. This conventional input can include, for example, a push button, touch pad, touch-based display, wheel, joystick, keyboard, mouse, trackball, keypad or any other such device or element whereby a user can submit an input to the device. These I/O devices could be connected by a wireless, infrared, Bluetooth, or other link as well in some implementations. In some implementations, however, such a device might not include any buttons at all and might be controlled only through touch inputs (e.g., touch-based display), audio inputs (e.g., spoken), or a combination thereof.

Figure 11:
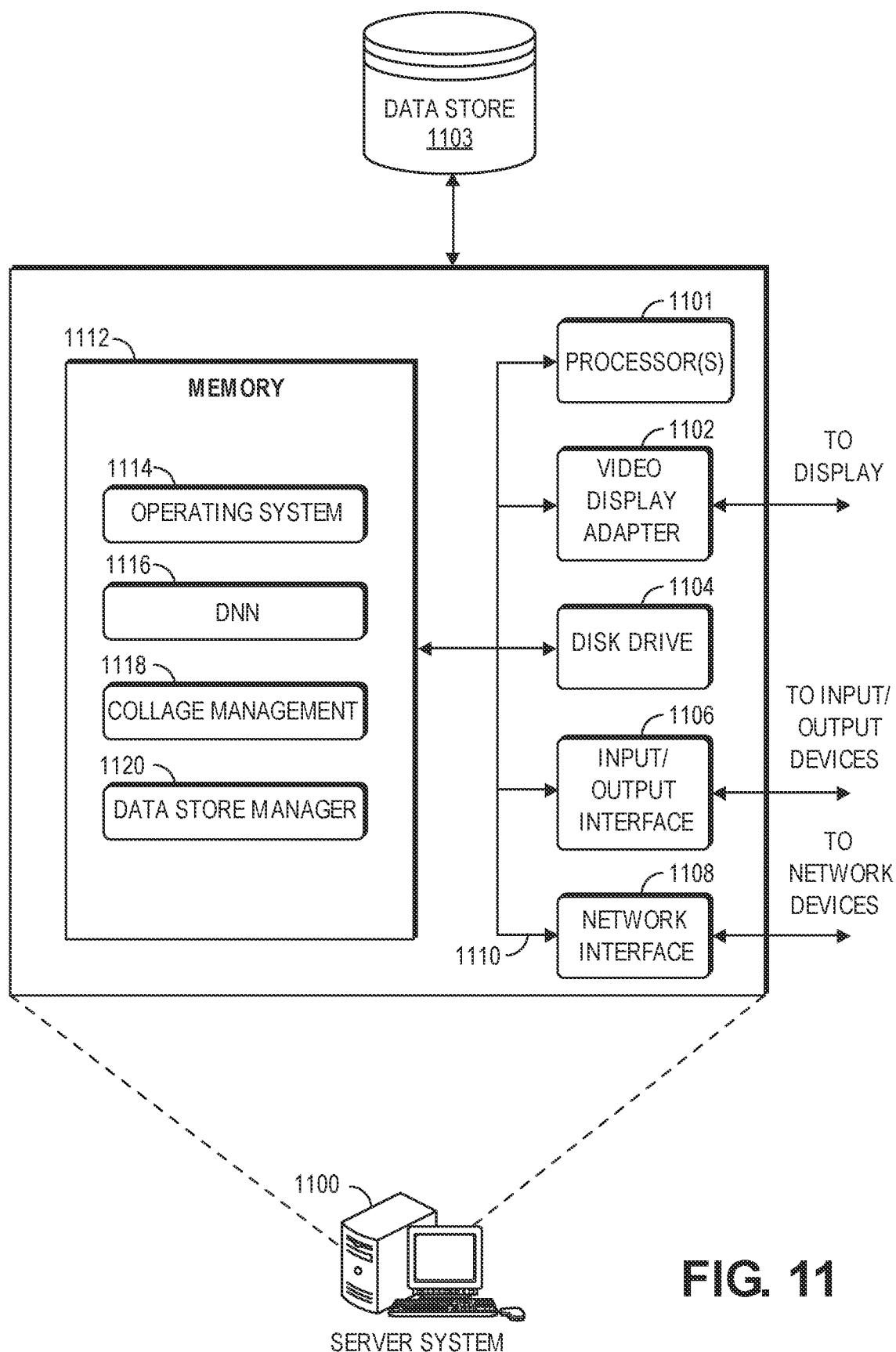
FIG. 11 is a pictorial diagram of an illustrative implementation of a server system that may be used for various implementations.

FIG. 11 is a pictorial diagram of an illustrative implementation of a server system 1100, such as a remote computing resource, that may be used with one or more of the implementations described herein. The server system 1100 may include one or more processors 1101, such as one or more redundant processors, a video display adapter 1102, a disk drive 1104, an input/output interface 1106, a network interface 1108, and a memory 1112. The processor(s) 1101, the video display adapter 1102, the disk drive 1104, the input/output interface 1106, the network interface 1108, and the memory 1112 may be communicatively coupled to each other by a communication bus 1110.

The video display adapter 1102 provides display signals to a local display permitting an operator of the server system 1100 to monitor and configure operation of the server system 1100. The input/output interface 1106 likewise communicates with external input/output devices not shown in FIG. 11, such as a mouse, keyboard, scanner, or other input and output devices that can be operated by an operator of the server system 1100. The network interface 1108 includes hardware, software, or any combination thereof, to communicate with other computing devices. For example, the network interface 1108 may be configured to provide communications between the server system 1100 and other computing devices, such as the user device 900.

The memory 1112 generally comprises random access memory (RAM), read-only memory (ROM), flash memory, and/or other volatile or permanent memory. The memory 1112 is shown storing an operating system 1114 for controlling the operation of the server system 1100. The server system 1100 may also include a trained DNN 1116, as discussed herein. In some implementations, the DNN may determine object segments on the server. In other implementations, the DNN 1012 (FIG. 10) may determine image segments on a user device. In still other examples, a DNN may exist on both the server and each user device.

The memory 1112 additionally stores program code and data for providing network services that allow user devices 900 and external sources to exchange information and data files with the server system 1100. The memory 1112 may also include a collage management application 1118 that maintains collage and/or collage information for different users that utilize the disclosed implementations. The collage management application 1118 may communicate with a data store manager application 1120 to facilitate data exchange and mapping between the data store 1103, user devices, such as the user device 900, external sources, etc.

As used herein, the term "data store" refers to any device or combination of devices capable of storing, accessing and retrieving data, which may include any combination and number of data servers, databases, data storage devices and data storage media, in any standard, distributed or clustered environment. The server system 1100 can include any appropriate hardware and software for integrating with the data store 1103 as needed to execute aspects of one or more applications for the user device 900, the external sources, etc.

The data store 1103 can include several separate data tables, databases or other data storage mechanisms and media for storing data relating to a particular aspect. For example, the data store 1103 may include digital items (e.g., images) and corresponding metadata (e.g., image segments, popularity, source) about those items. Collage data and/or user information and/or other information may likewise be stored in the data store.

It should be understood that there can be many other aspects that may be stored in the data store 1103, which can be stored in any of the above listed mechanisms as appropriate or in additional mechanisms of any of the data store. The data store 1103 may be operable, through logic associated therewith, to receive instructions from the server system 1100 and obtain, update or otherwise process data in response thereto.

The server system 1100, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction in FIG. 11 should be taken as being illustrative in nature and not limiting to the scope of the disclosure.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, media files, and machine learning should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some, or all of the specific details and steps disclosed herein.

Moreover, with respect to the one or more methods or processes of the present disclosure shown or described herein, including but not limited to the flow charts shown in FIGS. 2 through 6 and 8, orders in which such methods or processes are presented are not intended to be construed as any limitation on the claims, and any number of the method or process steps or boxes described herein can be combined in any order and/or in parallel to implement the methods or processes described herein. In addition, some process steps or boxes may be optional. Also, the drawings herein are not drawn to scale.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk, and/or other media. In addition, components of one or more of the modules and engines may be implemented in firmware or hardware.

Disjunctive language such as the phrase "at least one of X, Y, or Z," or "at least one of X, Y and Z," unless specifically stated otherwise, is otherwise understood with the context as used in general to present that an item, term, etc., may be any of X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" or "a device operable to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method, comprising:
    processing a first image to determine a first image segment that corresponds to less than all of the first image and corresponds to an object represented in the first image;
    presenting, on a user device, the first image and the first image segment such that the first image segment is visually distinguished from the first image;
    in response to a selection of the first image segment:
        extracting, from the first image, pixel data of the first image segment and metadata indicating at least one of the first image or a source location of the first image; and
        creating a first extracted image segment that is separate from the first image and that includes the pixel data and the metadata;
    determining a first seller of a first object represented in the first extracted image segment;
    presenting a collage that includes:
        the first extracted image segment that includes a first buyable indicator indicating that the first object is buyable; and
        a second extracted image segment representative of a second object extracted from a second image, the second extracted image segment including a second buyable indicator indicating that the second object is buyable;
        wherein:
            the collage includes image segments forming a portion of the first image or the second image;
            the first extracted image segment may be transformed with respect to the second extracted image segment;
            the first extracted image segment may be transformed with respect to a size of the first extracted image segment when presented on the collage, and
            the first extracted image segment may be transformed with respect to a position of the first extracted image segment when presented on the collage;
    in response to a purchase of the second object, changing the second buyable indicator to a purchased indicator indicating that the second object has been purchased.

2. The computer-implemented method of claim 1, further comprising:
    receiving a modification of the first image segment to modify which pixels of the first image are included in the first image segment.

3. The computer-implemented method of claim 1, wherein the metadata further includes one or more of: a link to a website from which the object can be purchased, additional information about the object, reviews of the object, a link to a second collage that includes the first extracted image segment, a popularity of the first extracted image segment, a comment corresponding to the first extracted image segment, a rating of the first extracted image segment, an indication of other collages that include the first extracted image segment, or an indication of a user that created the first extracted image segment.

4. The computer-implemented method of claim 1, wherein:
    processing the first image includes processing the first image to determine a plurality of image segments, wherein the first image segment is included in the plurality of image segments; and
    presenting includes presenting, on the user device, each of the plurality of image segments such that each of the plurality of image segments are visually distinguished from the first image.

5. The computer-implemented method of claim 1, further comprising:
    receiving an indication of a region of interest within the first image; and
    wherein processing includes processing a portion of the first image within the region of interest to determine the first image segment.

6. The computer-implemented method of claim 1, wherein processing the first image is performed on the user device.

7. The computer-implemented method of claim 1, further comprising:
    determining a third extracted image segment, based at least in part on a popularity of the third extracted image segment, a frequency with which the third extracted image segment is used on other collages, or a similarity between the third extracted image segment and at least one of the first extracted image segment or the second extracted image segment;
    presenting the third extracted image segment for selection; and
    in response to a selection of the third extracted image segment, presenting the third extracted image segment as part of the collage.

8. A computing system, comprising:
    one or more processors; and
    a memory storing program instructions that, when executed by the one or more processors, cause the one or more processors to at least:
        in response to receipt of a first selection of a first image segment of a first image:
            extract, from the first image, pixel data of the first image segment and metadata indicating at least one of the first image or a source location of the first image; and
            create a first extracted image segment that is separate from the first image and that includes the pixel data and the metadata;
        determine a seller of an object represented in the first extracted image segment;
        associate the seller with the first extracted image segment;
        present the first extracted image segment as part of a collage;
        present, with the first extracted image segment and concurrent with the presentation of the first extracted image segment as part of the collage, a buyable indication indicating that the object represented in the first extracted image segment is buyable through an interaction with the first extracted image segment;

receive a second selection of a second extracted image segment, wherein the second extracted image segment corresponds to a second image;

present the second extracted image segment with the first extracted image segment as part of the collage; wherein:

the collage includes image segments forming a portion of the first image or the second image; and the first extracted image segment and the second extracted image segment are independently transformable when presented as part of the collage; and in response to a purchase of the object, change the buyable indication to a purchased indication indicating that the object has been purchased.

9. The computing system of claim 8, wherein the program instructions that, when executed by the one or more processors, further cause the one or more processors to at least:

present a plurality of extracted image segments, wherein the second extracted image segment is included in the plurality of extracted image segments and selected from the plurality of extracted image segments.

10. The computing system of claim 9, wherein at least one of the plurality of extracted image segments is at least one of a popular extracted image segment, a trending extracted image segment, an extracted image segment that enables a purchase of an object represented in the extracted image segment, visually similar to the first extracted image segment, related to the first extracted image segment, or an extracted image segment generated by a user that selected the first extracted image segment.

11. The computing system of claim 8, wherein the program instructions that, when executed by the one or more processors, further cause the one or more processors to at least:

receive a request to transform the collage;

determine that the request is from a second user that is different than a first user that created the collage; and in response to determination that the request is from the second user:

generate a duplicate collage from the collage;

maintain, as part of a metadata for the duplicate collage, a link or other identifier indicating that the duplicate collage was generated based on the collage; and transform the duplicate collage in response to the request.

12. The computing system of claim 11, wherein the request is at least one of a request to:

add a third extracted image segment to the collage;

remove the second extracted image segment from the collage;

re-mix a presentation of the first extracted image segment of the collage and the second extracted image segment of the collage;

transform a position of the first extracted image segment; or transform a size of the first extracted image segment.

13. The computing system of claim 8, wherein the program instructions that, when executed by the one or more processors, further cause the one or more processors to at least:

receive a request to transform the collage;

determine that the request is from a user that created the collage or that the collage is a collaborative collage; and in response to determination that the request is from the user or that the collage is a collaborative collage:

transform the collage in response to the request.

14. The computing system of claim 8, wherein the program instructions that, when executed by the one or more processors, further cause the one or more processors to at least:

receive a modification to the first image segment to modify which pixels of the first image are included in the first image segment; and in response to the modification:

generate, based at least in part on the modification, a modified image segment; and update, based at least in part with the modified image segment, a training of a deep neural network ("DNN"), wherein the DNN is trained to generate one or more image segments from an input image.

15. The computing system of claim 14, wherein the program instructions that, when executed by the one or more processors, further cause the one or more processors to at least:

in response to the modification:

reprocess the first image segment to determine an object represented in the first image segment.

16. The computing system of claim 8, wherein the program instructions that, when executed by the one or more processors, further cause the one or more processors to at least:

process, with a deep neural network ("DNN"), the first image to determine the first image segment.

17. A method, comprising:

processing, with a deep neural network ("DNN"), a first image to determine a first image segment corresponding to an object represented in the first image, wherein the first image segment is less than all of the first image;

presenting, on a display, the first image segment and the first image such that the first image segment is visually distinguished from the first image;

in response to receiving a modification of the first image segment to modify which pixels of the first image are included in the first image segment, generating an updated first image segment;

in response to a selection of the updated first image segment:

extracting, from the first image, pixel data of the first image segment and metadata indicating at least one of the first image or a source location of the first image; and creating a first extracted image segment that is separate from the first image and that includes the pixel data and the metadata;

determining a seller of an object represented in the first extracted image segment;

associating the seller with the first extracted image segment;

presenting the first extracted image segment as part of a collage that includes at least a second extracted image segment representative of a second object extracted from a second image, wherein the collage includes image segments forming a portion of the first image or the second image;

presenting, with the first extracted image segment and concurrent with the presentation of the first extracted image segment and the second extracted image segment as part of the collage, a buyable indication indicating that the object represented in the first extracted image segment is buyable through an interaction with the first extracted image segment;

in response to a purchase of the object, changing the buyable indication to a purchased indication indicating that the object has been purchased.

18. The method of claim 17, further comprising:
updating a training of the DNN based at least in part on the first image and the updated first image segment.

19. The method of claim 17, wherein:
the display is included on a user device; and
the DNN operates on the user device.

20. The method of claim 17, wherein the first extracted image segment includes metadata, wherein the metadata includes one or more of an indication of the first image, an indication of a source location of the first image, a link to a website from which the object can be purchased, additional information about the object, reviews of the object, a link to a second collage that includes the first extracted image segment, a popularity of the first extracted image segment, or an indication of a user that created the first extracted image segment.

21. The method of claim 17, further comprising:
presenting, as part of the collage, an indication of a total number of extracted image segments included in the collage.

22. The method of claim 17, further comprising:
in response to receiving the modification, updating, based at least in part with the updated first image segment, a training of a deep neural network ("DNN"), wherein the DNN is trained to generate one or more image segments from an input image.

* * * * *